(12) United States Patent
Basyrov

(10) Patent No.: US 11,604,641 B2
(45) Date of Patent: Mar. 14, 2023

(54) METHODS AND SYSTEMS FOR RESOLVING USER INTERFACE FEATURES, AND RELATED APPLICATIONS

(71) Applicant: Marat Basyrov, Victoria (AU)

(72) Inventor: Marat Basyrov, Victoria (AU)

(73) Assignee: Adevi IP Holding Company Pty Ltd, Victoria (AU)

( * ) Notice: Subject to any disclaimer, the term of this patent is extended or adjusted under 35 U.S.C. 154(b) by 0 days.

(21) Appl. No.: 17/044,689

(22) PCT Filed: Apr. 4, 2019

(86) PCT No.: PCT/AU2019/050298
§ 371 (c)(1),
(2) Date: Oct. 1, 2020

(87) PCT Pub. No.: WO2019/191810
PCT Pub. Date: Oct. 10, 2019

(65) Prior Publication Data
US 2021/0042110 A1    Feb. 11, 2021

(30) Foreign Application Priority Data
Apr. 4, 2018 (AU) ............................... 2018202382

(51) Int. Cl.
*G06N 20/00*    (2019.01)
*G06F 8/77*     (2018.01)
(Continued)

(52) U.S. Cl.
CPC .............. *G06F 8/77* (2013.01); *G06F 3/0481* (2013.01); *G06F 8/38* (2013.01); *G06F 9/451* (2018.02);
(Continued)

(58) Field of Classification Search
CPC ... G06F 8/77; G06F 8/38; G06F 9/451; G06F 3/0481; G06F 8/34; G06F 3/0412;
(Continued)

(56) References Cited

U.S. PATENT DOCUMENTS 5,048,095 A    9/1991  Bhanu et al.
8,185,523 B2   5/2012  Lu et al.
(Continued)

FOREIGN PATENT DOCUMENTS

WO    2017017663 A1    2/2017

OTHER PUBLICATIONS

Shahriare Satu et al., Review of Integrated Applications with AIML based Chatbot, 2015 IEEE, [Retrieved on Sep. 7, 2022]. Retrieved from the internet: <URL: https://ieeexplore.ieee.org/stamp/stamp.jsp?tp=&arnumber=7399324> 4 Pages (87-90) (Year: 2015).*

(Continued)

*Primary Examiner* — Anibal Rivera
(74) *Attorney, Agent, or Firm* — Whitmyer IP Group LLC

(57) ABSTRACT

A method including the following steps: receiving user input; resolving a feature of the input using a trainable algorithm, the trainable algorithm being trainable to resolve a feature by application of the algorithm to a dataset including a plurality of labelled dataset entries, the label of each labelled dataset entry describing a feature; wherein the trainable algorithm resolves the features in user input by identifying in the user input a dataset entry labelled with said feature; forming a UI that incorporates the resolved feature; presenting the formed UI; obtaining feedback in relation to the presented UI or a feature thereof; applying the feedback to train the trainable algorithm to resolve features of a UI, wherein feedback for training the trainable algorithm derives
(Continued)

from any one or more of, or a combination of: user selection/validation/customisation of features presented to the user and/or user observation.

24 Claims, 19 Drawing Sheets

(51) Int. Cl.
| | |
|---|---|
| G06F 9/451 | (2018.01) |
| G06F 3/0481 | (2022.01) |
| G06F 8/38 | (2018.01) |
| G06Q 10/0631 | (2023.01) |
| G06Q 10/0637 | (2023.01) |
| G06Q 10/0639 | (2023.01) |
| G06Q 10/101 | (2023.01) |
| G06Q 10/10 | (2023.01) |
| G06Q 30/0201 | (2023.01) |
| G06Q 50/00 | (2012.01) |
| G06F 8/34 | (2018.01) |
| G06F 3/041 | (2006.01) |
| G06F 3/0482 | (2013.01) |

(52) U.S. Cl.
CPC ......... *G06N 20/00* (2019.01); *G06Q 10/0637* (2013.01); *G06Q 10/06316* (2013.01); *G06Q 10/06395* (2013.01); *G06Q 10/101* (2013.01); *G06Q 10/103* (2013.01); *G06Q 30/0201* (2013.01); *G06F 3/0412* (2013.01); *G06F 3/0482* (2013.01); *G06F 8/34* (2013.01); *G06Q 50/01* (2013.01)

(58) Field of Classification Search
CPC ................. G06F 3/0482; G06N 20/00; G06Q 10/06316; G06Q 10/0637; G06Q 10/06395; G06Q 10/101; G06Q 10/103; G06Q 30/0201; G06Q 50/01
See application file for complete search history.

(56) References Cited

U.S. PATENT DOCUMENTS

| | | | |
|---|---|---|---|
| 8,849,043 B2 | 9/2014 | Ptucha et al. | |
| 9,245,200 B2 | 1/2016 | Magri et al. | |
| 9,367,523 B2 | 6/2016 | Dontcheva et al. | |
| 9,754,163 B2 | 9/2017 | Segalovitz et al. | |
| 9,773,196 B2 | 9/2017 | Sachs et al. | |
| 10,521,466 B2* | 12/2019 | Bellegarda | G06F 16/335 |
| 2009/0309894 A1 | 12/2009 | Lam et al. | |
| 2010/0250473 A1 | 9/2010 | Porikli et al. | |
| 2011/0026835 A1 | 2/2011 | Ptucha et al. | |
| 2011/0276396 A1* | 11/2011 | Rathod | H04L 51/066 |
| | | | 705/14.49 |
| 2012/0226971 A1 | 9/2012 | Tocchini et al. | |
| 2013/0219263 A1 | 8/2013 | Abrahami | |
| 2014/0129942 A1* | 5/2014 | Rathod | H04N 21/44222 |
| | | | 715/720 |
| 2014/0282218 A1 | 9/2014 | Kaufman et al. | |
| 2015/0019204 A1 | 1/2015 | Simard et al. | |
| 2015/0134688 A1 | 5/2015 | Jing et al. | |
| 2016/0350794 A1 | 12/2016 | Amrany et al. | |
| 2016/0357713 A1 | 12/2016 | Tocchini et al. | |
| 2016/0371312 A1 | 12/2016 | Ben-Aharon et al. | |
| 2017/0032050 A1 | 2/2017 | Kol et al. | |
| 2017/0193403 A1 | 7/2017 | Iscoe et al. | |
| 2017/0228867 A1 | 8/2017 | Baruch | |
| 2018/0307464 A1* | 10/2018 | Bijani | G06F 8/36 |

OTHER PUBLICATIONS

Hashimoto et al., "Retrieving Web Page Layouts using Sketches to Support Example-based Web Design," EUROGRAPHICS Workshop on Sketch-Based Interfaces and Modeling (2005), p. 1-10.
Gupta, et al., "Document Layout Analysis and Classification and its Application in OCR," EDOCW '06, 10th IEEE Internatinal, Oct. 2006, 1 page (abstract only).
Vollick, et al., "Specifying Label Layout Styles by Example", UIST Oct. 2007, copyright 2007 ACM, p. 221-230 (abstract only).
Adevi.Io, "Adevi: GUI Design in the Blink of an Eye",<URL: https://webarchive.org/web/20170916074939/http://www.adevi.io/> published on Sep. 16, 2017 as per Wayback Machine.
Wikipedia, "Artificial Intelligence", published Apr. 1, 2018; URL: https://en.wikipedia.org/wlindex.php?title=Artificial_intelligence &oldid=833513578> Retreived on Sep. 30, 2020.
International Search Report and Written Opinion of the International Searching Authority; Application No. PCT/AU2019/050298; dated May 10, 2019; 24 pages.
Nivethika Mahasivam, et al; Personalized and Adaptive User Interface Framework for Mobile Application; 2013 International Conferenceon Advances in Computing, Communications and Informatics; Aug. 22, 2013; 6 pages.
Juarez-Ramirez Reyes et al; Automated Generation of User-Interface Prototypes Based on Controlled Natural Language Description; 2014 IEEE 38th International Computer Software and Applications Conference Workshops; Jul. 21, 2014; 6 pages.
FloydHub; Turning Design Mockups Into Code With Deep Learning; FloydHub blog Jan. 20, 2018; 35 pages.
Kevin Moran et al; Machine Learning-Based Prototyping of Graphical User Interfaces for Mobile Apps; Cornell University Library, 201 Olin Library Cornell University Ithaca, NY 14853; Feb. 7, 2018; Software Engineering Journal, 2018; 23 pages.
Extended European search report; Application No. EP197823669, Completed Nov. 11, 2021; 19 pages.

* cited by examiner

Adevi: Hi, Nick! Good to see you want to create a project for an idea you have. I can take you from beginning to the end. I will guide every step a provide solutions as we go. You will not be scratching your head for a second, you will have clear technical path. I will remove necessity to communicate tech language with me and anyone you will invite to collaborate.
Nick: I want a business app with social functions.
Adevi: Continuing dialog (takes less than 3 minutes) to understand requirements.
Adevi: Let's look some design that you may like.
You can change or let me do it for you.
I'll design for you something you should like. I'm sure you will have ideas on how to improve it, so you can change it after checking my work.
Nick: Ok I like this design.
Adevi: Nick, there is a Project Development report generated for you with the details we will be going through. You can modify it and your collaborators will be able to suggest the any areas of the development. You will be able to approve them before included to Main Development Plan. I constructed them for you and I believe you need them all to get finish your project, including the development. Please note that you will be able to invite people to finish parts of the project I cant do for you. You will be able to invite any people to help you with the project in anyway. Based on assigned roles.
Projects details will be disclosed to every person based on the assigned role. You can expand the role at any stage to include complete level of disclosure. I will inform the person you invite and will provide an overview of the project within the defined role. I will make sure the person understands the information (confirming main points user understands) and will try to answer any project related questions I can help with.
Nick: Sounds great! Thanks, Adevi!
Adevi: Let's look at some other main/core screens. Then we can look at the other remaining screens like settings, payment, profile screen. When we done with that there are some messages and walk through pages that needs to be updated.
You can choose to invite Copywriter or ask you friends to help you and provide feedback. To edit the workflow please drag and drop the screens at the preview section around.
Adevi: There is an option now available to invite your Designer to help you finish the project. Or just invite few friends to provide feedback? Two heads are good but more is better))
Nick: Ok I would like to invite my friend Anna. She knows UI design quite well.
Adevi: Hi Anna, your friend Nick, has started a project and would like to invite you to the project to give him feedback on his design choice. You can chat with him by clicking and creating password to this link.
Anna, thank you for coming to Adevi. Say hi to Nick. You can chat now.
Anna: the screens look great!
Adevi: Let's look at some design that you may like.
You can change or let me do it for you. John will be monitoring and the progress
I'll design for you something you should like. I'm sure you will have ideas on how to improve it, so you can change it after checking my work.
Nick: Ok I like this design.

FIG. 12A

Adevi: Hi John! Would you like to invite your new client to Adevi? Please use his email address to invite him for collaboration from the project page you have created for him.
John: Sounds good! I will invite, Nick.
Adevi: Hi Nick! John has invited you to initiate your project and collaborate using Adevi environment. John, from the software development company that you have enquired, has created a project and invited you to start and collaborate on your project from here. I will help to take you from beginning to the end and provide clear development plan. I will guide every step a provide solutions as we go. You will not be scratching your head for a second and John will be managing the whole process through out. I will remove necessity to communicate tech language with me and John and provide any explanations you may require. You can invite anyone you like to collaborate.
Nick: I want a business app with social functions.
Adevi: Continuing dialog (takes less than 3 minutes) to understand requirements
Adevi: Let's look at some design that you may like.
You can change or let me do it for you. John, will be monitoring and the progress.
I'll design for you something you should like. I'm sure you will have ideas on how to improve it, so you can change it after checking my work.
Nick: Ok I like this design.

FIG. 12B

METHODS AND SYSTEMS FOR RESOLVING USER INTERFACE FEATURES, AND RELATED APPLICATIONS

CROSS REFERENCE TO RELATED APPLICATIONS

This Application is a national phase entry of PCT/AU2019/050298, filed Apr. 4, 2019, and claims foreign priority to Australian Patent Application No. 2018202382, filed Apr. 4, 2018.

TECHNICAL FIELD

The invention relates to methods and systems for resolving user interface (UI) features, and related applications. More particularly, though not exclusively, the invention relates to methods and systems for using feedback to improve the process of resolving UI features, for designing a UI and for coding a UI. In a particular application, the invention concerns frontend development for a variety of software systems.

BACKGROUND ART

A user interface may be understood as allowing users to interact with electronic devices through visual, auditory, tactile or other means. Where the means are visual, the interface is commonly referred to as a GUI (Graphical User Interface). Examples of GUIs include desktop environments, internet browsers, displays on a wearable computer or hand-held device (eg. for the purposes of computer-mediated reality) and window managers such as compositors. The interface may alternatively involve the spoken word, where the user hears and responds verbally to the electronic device. Where the interface is touch based, it may include vibrations, pulsations, or dimensions which have a physical element.

This invention is particularly concerned with the software development lifecycle (SDLC) of UIs. In other words, the invention is concerned with methods and systems for resolving, forming, presenting and generating visual elements such as text, textboxes, icons, widgets and graphics which populate the visual displays of user interfaces, and the arrangement of such elements to provide the desired user experience (UX). However, the invention is not limited to the visual aspects of user interface and may include auditory or tactile or other means as described above. Novel applications of the methods and systems comprising the invention will also be described, in particular in relation to the use of feedback to improve the process of resolving UI features. The term UI feature is intended to capture a very wide range of features, and may include aspects such as workflow, project development using suggestions or prompts or project related information based on project specific content.

A well-designed UI should allow effective operation and control of an electronic device from the output (e.g. the visual display) provided at the user's end, whilst the device simultaneously returns to the user information that aids the user's decision-making process. Generally, the goal of a UI is to present an interface which makes it easy (self-explanatory), efficient, and enjoyable (user-friendly) to operate a device in the way which produces the desired result. This means that the user needs to provide minimal input to achieve the desired output, and also that the device minimises undesired outputs to the user. At another level, a UI should be easy to design and build, and give the project initiators as much freedom as possible to choose features such as style and layout.

The traditional model of creating a UI usually involves the following steps: (i) A project initiator has a project that requires a UI design; (ii) the project initiator approaches a designer, that, assuming that no design mock-ups have previously been developed, asks the project initiator a series of questions about what they want (e.g. what is the purpose of the project?; what are examples of designs that the project initiator likes, perhaps with reference to existing UIs which are already known); (iii) the project initiator provides examples material which he or she likes (e.g. graphics or sounds), as well as desired features (e.g. colour patterns or styles); (iv) the designer presents a number of mock-up designs for review, the cost of the designer generally increasing in line with the number of mock-ups provided and/or scope of the project; (v) the process is continued until the project initiator is satisfied with the UI, and then the necessary front and back-end development is completed (which may involve revising the proposed UI for implementation reasons); and (vi) coding and further SDLC stages or other stages based on the demands of the project. Project management of the UI creation process is also usually provided across the development process.

In the traditional model, a number of factors influence how effectively and efficiently a project initiator can get his or her idea into a usable form, including: ensuring that appropriate elements, layouts, styles, graphical effects (shades, gradients, 3D effects), screen-flow, on-screen animation, the foregoing applied in CSS or any other programming method known to the person skilled in the art (PSA), auditory effect or tactile effects, etc, are available to the designer; how well non-technical persons or creative contributors can communicate with those implementing the UI and UX, and particularly programmers; how well the project manager can control and encourage effective and efficient communication between the variety of contributors associated with the SDLC (or other development lifecycle); how well the end result is able to be maintained or restored; and where the self-designing novice tries to proceed with little outside support, how well they are able to negotiate unintuitive designing tools, manage choosing between the large range of tools and learn the necessary technical skills from complex tutorials.

It is therefore desirable to have a method or system for resolving features of UIs, which ameliorates or at least provides a useful alternative to the prior art, and which preferably: has the ability to improve with increased data capture and corresponding algorithm training, or learning based on feedback that naturally arises during use of the method or system.

It is therefore also desirable to be able to apply a method or system for resolving features of UIs as part of a UI generation procedure, which procedure ameliorates or at least provides a useful alternative to the prior art, and which preferably: is easy to use (i.e. does not require the project initiator to have a detailed understanding of all aspects of the process); presents numerous high quality (i.e. tailored to the project initiator) mock-ups or suggestions to a user in an accessible manner; removes communication barriers between the technologically savvy and less savvy; increases efficiency; lowers the cost for design and other parts of the SDLC (or other life-cycle), permitting a project initiator to proceed further down the development path; generates UIs in a streamlined workflow which manages a variety of contributors and minimises wasted designing effort including double-handling; ensures that a stable end-product is produced which may be used on a variety of platforms.

The advantages which may be provided by the subject invention will be able to be appreciated from the disclosure in this patent specification.

SUMMARY OF INVENTION

The present invention arises from a recognition that improvements in the resolution of UI features, and applications of an improved UI feature resolving process, can be achieved by leveraging increased data capture and corresponding algorithm training, or learning based on feedback.

Technical Problem

The technical problem resides in creating a method or system which is adapted to learn from feedback that naturally arises during the use of the method or system.

Solution to Problem

According to a first aspect of the invention, there is provided a method of applying feedback to resolve UI features, the method including the following steps:
Receiving user input;
Resolving a feature of the input using a trainable algorithm, the trainable algorithm being trainable to resolve a feature by application of the algorithm to a dataset including a plurality of labelled dataset entries, the label of each labelled dataset entry describing a feature;
wherein the trainable algorithm resolves the features in user input by identifying in the user input a dataset entry labelled with said feature;
Forming a UI that incorporates the resolved feature;
Presenting the formed UI;
Obtaining feedback in relation to the presented UI or a feature thereof;
Applying the feedback to train the trainable algorithm to resolve features of a UI;
wherein feedback for training the trainable algorithm derives from any one or more of, or a combination of:
user selection of features presented to the user;
user validation of features presented to the user;
user led customisation resulting by user choice of a feature;
user observation.

The feedback for training the trainable algorithm may derive from any one or more of, or a combination of:
user engagement, assessed using an engagement parameter rating;
UI quality assurance, assessed using a quality assurance parameter rating;
UI practicality, assessed using a practicality parameter rating.

The feature may include any one or more, or any combination of, the following:
An element, the element consisting of any one or more of, or any combination of, a logo, text, a shape, an icon, an emoji, a line, a widget, a controller, a menu, a map, background or other visual device;
An attribute consisting of any one or more of, or any combination of, a screen type, project type, screen layout, text location, style, colour, gradient of a background, gradient of an element, a design pattern, shading, 3D or 2D effect, content, AR or VR effect, or other visual effect;
the style or tone of one or more of, or a combination of, a mission/vision statement or other business related information which contextualises the UI, entity size and/or market capitalisation, a review or commentary, entity location or localisation, a description of a purpose or function for a proposed UI, technical documentation in relation to the scope and/or project development in connection with a proposed UI;
a workflow;
links between multiple screens or elements, and/or the rules governing said links;
a parameter rating;
a programming language.

The user may include one or more of, or a combination of, the following:
A project initiator;
An administrator;
A collaborator;
A third party.
and feedback is obtained from one or more of, or a combination of, said user(s).

User input may include one or more of, or a combination of:
image input data, the image input data including a screenshot or a hand drawing of a UI, a UI wireframe or a UI mock-up, non-UI images, other input in a visual format;
text input data, the text input data including a SRS, SDD, RAD, or other requirement document, text recovered from a social media search, text recovered from an internet search, company details including vision or mission statements, or other input in textual form;
third party input including data sourced from the internet including by software scrapers and/or online searching; data sourced from a searchable database developed by a third party; and/or data sourced from a searchable encyclopedia or other knowledge database.

The trainable algorithm may include an artificial neural network model for natural language processing (NLP) and/or computer vision. Preferably, the algorithm includes imaging and pattern recognition.

A dataset entry label may describe aspects of a feature, the label including any one or more of, or a combination of:
Whether the feature is an element or an attribute;
A feature class;
A tag or phrase to describe a quality of the feature;
A feature which is related to the feature the subject of the label;
A workflow which is related to the feature the subject of the label;
A link or rule which is related to the feature the subject of the label;
Accuracy data, including an input correlation algorithm score;
A trainable algorithm score;
A rating in relation to one or more of the engagement, quality assurance or practicality parameters.

The phrase or tag used to label the quality of a feature may describe any one or more of, or a combination of, the following:
the shape, dimension or size of an element;
the category of an element or attribute;
text font, size or other formatting;
the sentiment analysis of text;

the industry type of an element or attribute;
the screen type;
workflow;
programming language;
screen orientation;
the location of the element or text relative to the screen border or other elements;
the colour, style, layout, shading, animation, pattern or other visual effect;
any other quality which describes the feature.

The selections, validations and/or customisations may be made in relation to:
one or more alternative feature;
one or more alternative related features;
one or more alternative linked screens, linked features or rules;
one or more alternative UI screens;
one or more linked screens, linked features or rules;
one more alternative UI workflows;
presented to the user.

The one or more alternative(s) presented to the user may be determined based on user input and/or any internet search done in relation to user input and/or prior user selections and/or validations. The one or more alternatives presented for selection may be resolved by a trainable algorithm.

The plurality of labelled dataset entries may include an entry with a label that has been created by the user selecting, validating or customising a feature resolved by the trainable algorithm.

The selecting, validating or customising a feature may cause a labelling action of one or more dataset entries with the features selected, validated or customised, or the creation of a new dataset entry. A labelling action may include any one or more of, or a combination of, adding to or modifying:
a class
a tag or phrase
an input correlation accuracy score
a trainable algorithm accuracy score
a workflow
a link or rule
a parameter rating
of a label.

The plurality of labelled dataset entries may include user and/or third-party input labelled by a user, administrator, collaborator or third party, and/or by an action of said user Preferably, labelling of input is able to be performed by application of the trainable algorithm in an unsupervised manner.

Preferably, the trainable algorithm is able to process unlabelled input to resolve a feature thereof, and consequently perform a labelling action to describe a feature of said unlabelled input.

The method may include a pre-processing step consisting of operating on user input and/or third-party input to optimise the input before undertaking the resolving step in relation to said input. The pre-processing may include processing the input with a pre-processing algorithm able to pre-resolve a feature in the input. Preferably, the pre-processing algorithm is able to recognise text and/or images in the input. The pre-processing algorithm may include an OCR and/or NLP pre-processing algorithm for processing the text recognised in the input. Preferably, the pre-processing algorithm is able to cleanse and/or parse text.

The pre-processing preferably includes determining whether the input satisfies noise levels below a pre-determined threshold, or a minimum number of pixels per square cm required for processing the input.

Preferably, the pre-processing algorithm is trainable to pre-resolve features by application of the algorithm to the dataset in the same manner as the trainable algorithm. The trainable pre-processing algorithm is preferably able to pre-process unlabelled input to pre-resolve a feature thereof and consequently perform a labelling action to describe a feature of said unlabelled input.

The pre-processing algorithm or the trainable algorithm may include a computer vision enhanced segmentation algorithm for processing the images recognised in the input. The computer vision enhanced segmentation algorithm is able to segment regions and/or elements in an image input including one or more of, or a combination of:
icons/widgets;
charts;
chat bots;
pictures.
buttons;
data tables;
blocks of text;
text labels;
fields;
controlled elements.

The formed UI may include a plurality of UI screens able to be presented to the user, such that selection and/or validation is obtainable in relation to the plurality of UI screens, or region(s) of one or more UI screen(s), or features of one or more UI screen(s).

There may be provided a further step of generating the UI in a stable code format permitting customisation while preserving the integrity of the coding. Preferably, each dataset entry corresponding to a resolvable feature has a corresponding stable code portion. Each corresponding stable code portion may be able to be grouped with another corresponding stable code portion and remain in a stable code format.

The trainable algorithm or pre-processing algorithm is preferably able to resolve a related feature in relation to input, the related feature comprising a feature related to a resolvable feature. The related feature may include one or more features which the algorithm assesses to be closely related to the resolved feature. When the related feature is an element, the related element may include a non-resolved element having a resolved attribute.

Preferably, a plurality of related features are presented to the user for selection. Preferably, the formed UI incorporates the related feature.

Preferably, a workflow is resolvable by a trainable algorithm trained to identify a suitable link, linked features, or linked screens during the process of resolving features of the input. The suitable link(s), linked features and/or linked screens permit the presented UI to function substantially the same as in a fully developed UI form.

A wireframe view of the UI including the plurality of linked screens is preferably able to be presented to the user, the wireframe view indicating the links between the UI screens and/or linked features therein.

Preferably, the trainable algorithm is able to respond to text input provided by the user to suggest one or more project tasks to the user to assist generation of the UI.

A chat bot or an external application is preferably usable to prompt the user to supply further input. The chat bot or external application is preferably trainable by applying NLP to the crawled data. The chatbot or external application may update collaborative project parties on activities related to their roles including project owner, administrator, manager, initiator, or third party. The chatbot or external application may be able to use algorithms trained in accordance with the method claimed in the preceding claims to translate information into technical language for a technical contributor, suggests tasks and/or ask and answer questions, such activities of the chatbot preferably being modelled to suit the contributor. The chatbot or external application is able to provide pre-processed workflows with options for the user to approve and select.

The trainable algorithm includes machine learning algorithms trainable based on workflows and/or actions of the user to enable the chatbot or external application to suggest project activity or communicate with a user.

The method may include a further step of providing the user a clickable prototype of the presented UI.

The method may include a further step of generating the UI in a development ready form.

In a second aspect of the invention, there is provided a system for applying feedback to resolve UI features including a server accessible by user devices via an electronic communications network, the server comprising:
a processor;
a database; and
one or more user interface,
    the processor operatively interacting with the user interface(s) to execute steps in conjunction with the database,
the server being configured to execute the steps of:
    Receiving user input;
    Resolving a feature of the input using a trainable algorithm, the trainable algorithm being trainable to resolve a feature by application of the algorithm to a dataset including a plurality of labelled dataset entries, the label of each labelled dataset entry describing a feature;
        wherein the trainable algorithm resolves the features in user input by identifying in the user input a dataset entry labelled with said feature;
    Forming a UI that incorporates the resolved feature;
    Presenting the formed UI;
    Obtaining feedback in relation to the presented UI or a feature thereof;
    Applying the feedback to train the trainable algorithm to resolve UI features;
        wherein feedback for training the trainable algorithm derives from any one or more of, or a combination of:
            user selection of features presented to the user;
            user validation of features presented to the user;
            user led customisation resulting by user choice of a feature;
            user observation.

In a third aspect of the invention, there is provided a non-transitory computer readable storage medium comprising instructions that, responsive to execution by a computer, cause the computer to implement a method or system of applying feedback to resolve UI features, including carrying out the steps of:
    Receiving user input;
    Resolving a feature of the input using a trainable algorithm, the trainable algorithm being trainable to resolve a feature by application of the algorithm to a dataset including a plurality of labelled dataset entries, the label of each labelled dataset entry describing a feature;
        wherein the trainable algorithm resolves the features in user input by identifying in the user input a dataset entry labelled with said feature;
    Forming a UI that incorporates the resolved feature;
    Presenting the formed UI;
    Obtaining feedback in relation to the presented UI or a feature thereof;
    Applying the feedback to train the trainable algorithm to resolve UI features;
        wherein feedback for training the trainable algorithm derives from any one or more of, or a combination of:
            user selection of features presented to the user;
            user validation of features presented to the user;
            user led customisation resulting by user choice of a feature;
            user observation.

According to a fourth aspect of the invention, there is provided a method of resolving UI features, including the following steps:
    Receiving user input;
    Resolving a feature of the input using a trainable algorithm;
    Forming a UI that incorporates the resolved feature;
    Presenting the formed UI;
    Obtaining feedback in relation to the presented UI or a feature thereof;
    Applying the feedback to train the trainable algorithm to resolve UI features.

In a fifth aspect of the invention there is provided a system for resolving UI features, and related applications.

The system for resolving UI features preferably includes a server accessible by user devices via an electronic communications network, the server comprising:
a processor,
a database,
one or more user interface,
    the processor operatively interacting with the user interface(s) to execute steps in conjunction with the database,
    the server configured to execute the steps of:
    Receiving user input;
    Resolving a feature of the input using a trainable algorithm;
    Forming a UI that incorporates the resolved feature;
    Presenting the formed UI;
    Obtaining feedback in relation to the presented UI or a feature thereof;
    Applying the feedback to train the trainable algorithm to resolve UI features.

In a sixth aspect of the invention there is provided a non-transitory computer readable storage medium comprising instructions that, responsive to execution by a computer, cause the computer to implement a method or system of resolving UI features, including carrying out the steps of:
    Receiving user input;
    Resolving a feature of the input using a trainable algorithm;
    Forming a UI that incorporates the resolved feature;
    Presenting the formed UI;
    Obtaining feedback in relation to the presented UI or a feature thereof;
    Applying the feedback to train the trainable algorithm to resolve UI features.

The following description of preferments is relevant to each of the abovementioned aspects of the present invention.

Preferably, there is provided a further step of generating the presented UI.

The user may include one or more of, or a combination of, the following:
    A project initiator;
    An administrator;
    A project manager;

A collaborator;

A third party.

Feedback may be obtained from one or more of, or a combination of, the following users:
the project initiator;
the administrator;
the project manager;
the UI creation collaborator;
A third party, which may include third party source codes which describe external UI feature resolving techniques and/or externally sourced graphics.

Preferably, a group of the abovementioned users (for example, one or more project initiator(s), one or more administrator(s), one or more project manager(s), one or more collaborator(s) and one or more third party(ies)) may be collectively engaged in a project relating to the design or development of a UI, wherein each user has one or more tasks. The collective engagement may include one or more engagement parameters set by a project manager or administrator, including for communication between the users such as the ability for users in the group in the project to share their activity with other users, correspond via a communal chat channel with other users.

Preferably, an engagement parameter comprises an administrator assigning tasks in the project to users in the group so that some tasks assigned to some users overlap with tasks assigned to other users in the group. An engagement parameter may also include assigning tasks to users in the group such that some are assigned tasks that are distinct form the tasks assigned to other users in the group. The engagement parameters such as overlapping and distinct tasks of the group members and communication related parameters may be chosen in a manner that results in increased communication between the users, compared to other parameter choices or where users are not collectively engaged in a project. The method provides for obtaining engagement feedback in the form of data regarding the amount of engagement feedback such as the collective number of instances of user to user/group communication, the number of instances of user to user/group communication preceding validation, selection or customisation of a UI feature in the project.

Other parameters producing feedback may be applied in a like manner to that described above in relation to engagement parameters, such as a quality assurance parameter for measuring the quality of the UI that is presented, generated, or provided in clickable prototype form. The quality assurance parameter may provide feedback in the form of measurable data to improve one or more of the following processes: the quality, consistency or suitability of resolved features such as the colour or style (in particular as between linked UI screens, or as between third party input and resolved features), screen types, pixels numbers, or other features as described herein.

A further parameter is a practicality parameter concerned with the functional operability of features in a UI developed using the method of the invention. Preferably, the practicality parameter includes the functional considerations of user experience as well as the stability of the corresponding coding of the deployment ready form. The functional operability of features may be assessed, for example, on a screen or device suitability basis, or by consideration workflow or layout. For example, the combination of some elements with certain widgets may not be practical to split between various mobile screens; on the other hand, combinations of different elements and widgets may be well suited to the same mobile screens. The practicality parameter may assess features such as layout or individual or groups of functional blocks (groups of elements that represent functionality with the complete activity for a UI screen or between the screens, including so called "widgets"), screens, workflow, proposed screen type for the UI etc., considered separately or together with the stability of coding of the corresponding development ready form.

Feedback may be obtained by observation of one or more users, including observation of actions performed by the user, and consequences of those actions.

User actions may include user activity including user activity in relation to a chat bot or group chat bot, whether user activity results in increased or decreased quality one or more assurance and/or practicality parameter(s).

The trainable data for the functional blocks or individual groups may be resolved using by pre-processing data sets manually (i.e. by annotating them) or by clustering algorithms like k-nearest neighbour, k-means and other type of algorithms including various models and other methods know to the PSA.

Preferably, each of the parameters are adapted to provide feedback for improved training of the trainable algorithms, including in relation to UI sketching, UI design, frontend development and prototyping, or other aspect of the UI development process set out herein including project management aspects of frontend and backend development.

The parameters described may also be used to assist the determination of an input correlation algorithm score or a trainable algorithm score, described elsewhere in in the specification.

User input may include image input data and/or text input data. User input may also include other input known to the skilled addressee, such as audio files, or input which describes or otherwise relates to a VR or AR environment.

Image input may include one or more of, or a combination of: a screenshot or a hand drawing of a UI, a UI wireframe or a UI mock-up, or non-UI images. Image input may also include other input known to the skilled addressee, such as video files or artistic works in any visual format.

The text input may include one or more of, or a combination of: a user created document; a SRS, SDD, RAD, or other requirement document; text recovered from a social media search; text recovered from an internet search; company details including vision or mission statements. Text input may also include other input known to the skilled addressee, such as artistic works in textual form.

The receiving input step may include performing a database or internet search, the search results being added to the user input for processing. The internet search may be performed based on features resolved by the trainable algorithm from the user input.

The receiving step, or later steps such as the UI forming or the UI presenting steps, may include prompting the user to answer questions or to enter particular information. The prompting for further information is preferably provided where the resolving step resolves a diverse range of features and/or the user consistently rejects or does not approve formed or presented features.

A feature may include an element and/or attribute. A feature may include a workflow or programming language.

An element able to be resolved by the trainable algorithm may include one or more of, or a combination of: a logo, text, a shape, an icon, an emoji, a line, a widget, a controller, a menu, a map, background or another visual device.

An attribute able to be resolved by the trainable algorithm may include one or more of, or a combination of: screen type, project type, screen layout, text location, style, colour, gradient of a background, gradient of an element, a design pattern, shading, 3D or 2D effect, content, AR or VR effect, or other visual effect.

An attribute able to be resolved by the trainable algorithm may include the style or tone of one or more of, or a combination of: a mission/vision statement, entity size and/or market capitalisation (or other business related information which contextualises the UI), a review or commentary, entity location or localisation, a description of a purpose or function for a proposed UI, technical documentation in relation to the scope and/or project development in connection with a proposed UI.

The trainable algorithm may be trained to resolve a feature by application of a machine learning algorithm or other learning algorithm to a dataset.

The machine learning algorithm may apply any one, or more of, or a combination of:
  supervised learning technique;
  an unsupervised learning technique;
  a semi-supervised learning technique;
  an active learning technique;
  a transfer learning technique; and/or
  other techniques known to the PSA.

The trainable algorithm may apply one or more of the following: decision tree learning, association rule learning, artificial neural networks including CNNs, inductive logic programming, support vector machine, clustering, bayesian network, reinforcement learning, random forests, SVM, K-NN, pattern recognition, RNN (LSTM), a GAN model, Word2Vec, Named Entity Recognition, Latent Dirichlet Allocation, a combinatorial model, a bag of words model; artificial neural network models for natural language processing (NLP); computer vision, including imaging and pattern recognition.

The trainable algorithm may apply NLP, or any one or more of the other trainable algorithms referred to above, to resolve a feature of user input containing graphical information. In particular, the trainable algorithm may apply NLP, or any one or more of the other trainable algorithms referred to above, to the graphical information to resolve a feature that is subsequently incorporated into a UI formed by the method of the invention. In a further preferred form, the formed UI is then used by the method of the invention to generate a UI in coded development ready form.

The graphical information may include graphical and illustration components that form part of a UI or all of the UI. In particular, graphical information may comprise one or more background illustration(s) having a resolvable style or theme.

In a preferred form, the one or more trainable algorithms are suited for image and natural language processing and apply one or more machine learning and/or computer vision models. A plurality of trainable algorithms may be used to operate on data (e.g. user data, searched data related to user data, or third party/internet data as part of the feature resolving and/or training process).

In a further preferred form, the method includes the application of one or more computer vision methods (e.g. image or video processing, CNN or Mask R-CNN or other methods known to the PSA) or other algorithms that permit the automation of tasks in the traditional model of UI creation. Preferably, the invention enhances the actions of those contributing to the UI with the use of AR, VR (e.g. user controllable components that respond to gestures or movements by a user) and/or chatbot technologies, as described elsewhere in the specification.

The dataset may include a plurality of labelled dataset entries.

A labelled dataset entry may operate as a target to which the trainable algorithm can be applied to train the trainable algorithm to resolve features. Once the trainable algorithm is trained, it may process unlabelled input with greater accuracy.

The label of each labelled dataset entry describes a feature.

The trainable algorithm may resolve a feature in user input by identifying in the user input a dataset entry labelled with said feature.

The plurality of dataset entries may include resolved features from the UIs (or particular features thereof) that have been presented, formed, generated, etc by application of the method of the invention. The plurality of dataset entries may also include dataset entries from external sources (i.e. third-party input).

The plurality of labelled dataset entries may include labelled user input, or a part thereof.

The plurality of labelled dataset entries may include labelled third party input, or a part thereof.

The third party input may include data sourced from one or more of, or a combination of:
  the internet, including by software scrapers and/or online searching;
  a searchable database developed by a third party;
  a searchable encyclopedia or other knowledge database.

Third party input may include screenshots of crawled UIs, or cropped elements of crawled UIs, third party source codes which describe external UI feature resolving techniques and/or externally sourced graphics.

Internet sourced data includes data crawled from one or more of, or a combination of:
  frontend code;
  online encyclopedia or other knowledge database; and
  online repository displaying user-made artwork.

Internet sourced data may include data crawled from one or more of, or a combination of:
  an application programming interface search;
  an internet search engine.

Third party input may include data regarding any one or more of the following, about an entity in connection with a UI:
  a mission/vision statement
  entity size and/or market capitalisation,
  a review or commentary
  entity location or localisation
  text recovered from a social media search
  text recovered from an internet search
  number of downloads
  user reviews
  sentiment analysis of user reviews.

The knowledge database preferably includes the labelled dataset entries which derive from the operation of the method of the invention in previous UI design projects, and in particular the labelled dataset entries deriving from the feedback from users engaging the process of selecting, validating, etc features during the presentation, formation, and generation of a UI.

The method preferably provides for resolving of features including patterns in the creation of labelled dataset entries during the process of users engaging in the outlined steps of UI generation in accordance with the invention, during the processing of third party information, or during pre-processing. Preferably, fluid data and/or meta data is able to be extracted from patterns with a combination of fixed and non-fixed relationships. Fluid data and meta data may be extracted from interactions between one or more users on a project resulting in a final completed project that is extracted for code implementation. The code implementation in turn may be validated by the project or system administrator). Meta data and/or fluid data may be extracted from patterns relating to a particular feature (e.g. registration and login procedure within a project).

A dataset entry label may describe aspects of a feature, the label including any one or more of, or a combination of:
  Whether the feature is an element or an attribute
  A feature class
  A tag or phrase to describe a quality of the feature
  A feature which is related to the feature the subject of the label
  A workflow which is related to the feature the subject of the label
  A link or rule which is related to the feature the subject of the label
  Accuracy data, including an input correlation algorithm score
  a trainable algorithm score.

The input correlation algorithm score preferably indicates how accurately the input is resolved by the trainable algorithm.

The trainable algorithm score indicates how accurately a trainable algorithm resolves the feature, related features, or features in a similar class.

The plurality of labelled dataset entries may include an entry with a label that has been created by the user validating a feature resolved by the trainable algorithm, which action causes a label indicating that feature to be applied to said entry.

The plurality of labelled dataset entries may include user input labelled by an administrator, project manager, collaborator or third party.

The plurality of labelled dataset entries may include third party input labelled by the action of a user, administrator, project manager, collaborator or third party.

The plurality of labelled dataset entries may include an engagement and/or quality assurance parameter.

The dataset is added to by the actions performed during the process of user interaction with the resolving, presenting, selecting and/or validating of features in relation UI projects.

Labelling of input may be performed by application of a machine learning algorithm.

Machine learned labelling may be performed in an unsupervised manner.

Preferably, labelling may include the labelling of features having a common style, theme or visual appearance or other recognised correlation, as a cluster of related features. It is particularly preferred to apply NLP to labelling of clusters of text and/or tags.

The trainable algorithm may be able to process unlabelled input to resolve a feature thereof and consequently perform a labelling action to describe a feature of said unlabelled input.

User input may be directly labelled by the user to assist the processing of said input.

Third party input may be pre-labelled to assist the processing of said input (i.e. the input may be labelled before it is processed or pre-processed by the trainable algorithm).

Input labelled by action of a user, administrator, project manager, third party or trainable algorithm, may be added to the dataset entries to further train the trainable algorithm.

The phrase or tag used to label the quality of a feature describes any one or more of the following:
  the shape, dimension or size of an element
  the category of an element or attribute
  text font, size or other formatting;
  the sentiment analysis of text
  the industry type of an element or attribute
  the screen type
  screen orientation
  workflow
  programming language
  the location of the element or text relative to the screen border or other elements
  the colour, style, layout, shading, animation, pattern or other visual effect
  any other quality which describes the feature The processing of input may include pre-processing which operates prior to processing.

Pre-processing may operate on user input and/or third party input.

Pre-processing may include optimising the input before processing.

Pre-processing may include processing the input with a pre-processing algorithm able to pre-resolve a feature in the input.

The pre-processing algorithm is preferably able to recognise text and/or images in the input.

The pre-processing algorithm may include an OCR and/or NLP pre-processing algorithm for processing the text recognised in the input.

The pre-processing algorithm may cleanse and/or parse text.

The pre-processing training algorithm applies a Word2Vec algorithm, Latent Dirichlet Allocation, Named Entity Recognition, Bag of Words model or other algorithms or techniques known to the PSA.

The pre-processing algorithm preferably includes a computer vision enhanced segmentation algorithm and/or other image processing and/or other algorithms for processing the images recognised in the input known to the PSA.

Computer vision enhanced segmentation algorithm is preferably able to segment regions and/or elements in an image input including one or more of, or a combination of:
  icons/widgets [because of size];
  charts;
  chat bots;
  pictures.
  buttons;
  data tables;
  blocks of text;
  text labels;
  fields;
  controlled elements;
  other features.

Pre-processing of input may permit said input to be more efficiently processed by pre-resolving a feature of the input. In a preferred form, the pre-processing of input includes clustering features together as outlined elsewhere in this specification.

The pre-processing algorithm may be trainable to pre-resolve features by application of a machine learning algorithm and/or image processing algorithms or other algorithms to the dataset.

The pre-processing algorithm may be trainable in the same manner as the trainable algorithm.

The pre-processing may include determining whether the input satisfies one or more minimum requirements (e.g. it has noise levels below a pre-determined threshold).

The one or more minimum requirements may include a minimum number of pixels per square cm required for processing the input. The minimum requirements may change depending on the intended use of the algorithm adopted.

Trainable pre-processing algorithm is preferably able to pre-process unlabelled input to pre-resolve a feature thereof and consequently perform a labelling action to describe a feature of said unlabelled input.

A plurality of features in the input may be resolvable by the trainable algorithm and one or more of said plurality of features may be able to be incorporated into the UI and/or presented to the user and/or validated by the user.

A plurality of features in the input may be pre-resolvable by the pre-processing algorithm and one or more of said plurality of features may be able to be incorporated into the UI and/or presented to the user and/or validated by the user.

The formed UI may include a plurality of UI screens.

The plurality of UI screens are preferably presented to the user for validation.

Validation may be obtained in relation to the plurality of UI screens, or region(s) of one or more UI screen(s), or features of one or more UI screen(s).

The plurality of UI screens may be linked.

One or more feature(s) may be linked in one or more linked screens.

Rules preferably determine how a plurality of screens are linked or how the linked features operate.

The plurality of linked screens, or the one or more linked features, or one or more linking rules, may be presented to the user based on a UI workflow.

The UI workflow may be resolved by a trainable algorithm trained to identify a suitable link, linked features, or linked screens during processing of input.

Alternative linked screens, linked features or rules may be presented to the user for selection.

Validation is preferably obtained in relation to presented linked screens, linked features or rules.

The links may permit the presented UI to function substantially the same as in a fully developed UI form.

A wireframe view of the UI including the plurality of linked screens may be presented to the user.

A wireframe view of the plurality of UI screens may indicate the links between the UI screens and/or linked features therein.

The trainable algorithm or pre-processing algorithm is preferably able to resolve a related feature in relation to input, the related feature comprising a feature related to a resolved feature. The related feature may include one or more features which the algorithm assesses to be closely related to the resolved feature.

Where the related feature is an element, the related element may include a non-resolved element having a resolved attribute.

The formed UI preferably incorporates the related feature.

A plurality of related features are preferably presented to the user for selection.

The user is preferably able to make selections in relation to the formed and/or presented UI.

The user is preferably able to select from alternative screen types and/or orientations and/or layouts for a UI or individual UI screen.

Selectable screen types may include the following screen types: smartphone, tablet, smartwatch, desktop computer or laptop computer, or VR or AR environments.

Selectable orientations may include landscape/horizontal or portrait/vertical.

The alternative screen types and/or orientations and/or layouts may be resolved by an algorithm trained in relation to a dataset of screen types and/or orientations and/or layouts.

Selections may be made in relation to:
one or more alternative feature;
one or more alternative related features;
one or more alternative linked screens, linked features or rules;
one or more alternative UI screens;
one more alternative UI workflows;
which are presented to the user.

The UI presented to the user may incorporate the selected features.

The selections presented to the user are preferably determined based on user input and/or any internet search done in relation to user input and/or prior user selections and/or validations.

The one or more alternatives presented for selection are preferably resolved by a trainable algorithm.

The trainable algorithm is preferably one of the same trainable algorithms able to be used to resolve the related feature.

The selections may be presented to the user in WYSIWYG form.

The user may switch and/or preview and/or modify a presented selection (eg. a feature).

There may be provided a further step of providing the user a clickable prototype of the presented UI or UI screens.

The clickable prototype may include links between UI screens.

The clickable prototype may be provided prior to validation

The clickable prototype may be coded in the XCode IDE, Visual Studio, Java Script frameworks, Eclipse, Android Studio, AWS Cloud9, or another IDE or online IDE.

The clickable prototype may be coded using Swift, Java, JavaScript, Python or another programming language known to the PSA.

The presented UI or the clickable prototype, or any feature thereof, may be customised by the user.

Customisation preferably includes the user choosing a feature or other aspect of the UI for customisation. Other customisable aspects include links between multiple screens (and/or the rules governing said links), layout or workflow.

Customisation preferably includes providing the user one or more related features for selection, in relation to the feature chosen by the user to be customised.

The related features may be resolved by a trainable algorithm.

Further input may be received in relation to one or more features for customisation, such that the related features provided to the user for selection are updated in accordance with the further input.

Prior to generating the UI, user validation of any selection or customisation may be obtained.

User validation in relation to an aspect may be obtained during the formation and/or presentation of the UI, which validation effectively fixes the validated aspect against modification or customisation.

Once a user validates an aspect, other aspects of the UI are suggested to be updated for consistency with the validated aspect.

Preferably, features presented for selection, validation, etc are combined into clusters having related features at the point of presentation so that features having a common style, theme or visual appearance or other recognised correlation, are able to be efficiently selected, validated, etc by selecting, validating, etc a cluster instead of each feature (e.g. element or attribute) individually. There may be clustering of features across multiple screens, including, for example clustering of sets of rules connecting screens or combinations of features across an entire UI project. Preferably, those features presented to the user (whether or not in a group) are prioritised on the basis of factors which improve the efficiency of UI generation process, including in particular in relation to prioritising the presentation of a UI (or parts of a UI, or features thereof) that are able to be efficiently generated in a deployment ready form.

Feedback for training the trainable algorithm may derive from any one or more of, or a combination of:

Feedback from user selection
Feedback from user validation
Feedback from user led customisation
Feedback from user observation (including workflow)
Feedback from user activity (e.g. via engagement parameters or other parameters).

A user may be able to validate any UI formed, presented or generated, or any feature thereof, including the resolving of a feature.

An administrator user, project manager user or collaborator user is able to validate any UI created by a project initiator, or any feature thereof, and/or any UI selection/validation of a project initiator.

Any selection and/or validation by a user, or any validation by the administrator or project manager, in other words feedback, is able to be used to train the trainable algorithm or pre-processing algorithm.

The selection and/or validation action may cause a labelling action of one or more dataset entries with the features selected and/or validated, or the creation of a new dataset entry.

A labelling action includes any one or more of, or a combination of, adding to or modifying:

A class
A tag or phrase
An input correlation accuracy score
A trainable algorithm accuracy score
A workflow
A link or rule
of a label.

Feedback may be filtered so that not all feedback received by the actions of a user (e.g. a poorly performing collaborator or inexperienced project initiator) is used to update the dataset entries.

The administrator may assign a user (e.g. a well performing collaborator or experienced project initiator) trusted status so that all validations or selections by that user are provided as feedback and able to be used to update the dataset entries for further training of the trainable algorithm or pre-processing algorithm.

Any one or more of the trainable algorithms may apply transfer learning techniques to learn from user validation.

There may be provided further step of generating the UI in deployment ready form. Preferably, the deployment ready form has a stable code format.

The deployment ready form is preferably coded in the XCode IDE, Java Script frameworks, Visual Studio, Eclipse, Android Studio, AWS Cloud9, or another IDE or online IDE known to the PSA.

The deployment ready form may be coded using Swift, Java, JavaScript, Python or another programming language known to the PSA.

The deployment ready form may be built using machine learning algorithms or other algorithms, including retrieval pre-made sets from the dataset.

The UI in deployment ready form may be further customised while preserving the integrity of the coding.

Each dataset entry corresponding to a resolvable feature preferably has a corresponding stable code portion.

Each corresponding stable code portion is preferably able to be grouped with another corresponding stable code portion and remain in a stable code format.

Preferably, stable code portion is able to be clustered with other stable code portion where it the code portions correspond to features which are related. Preferably, where one stable code portion a cluster is modified the other stable coded portions in the cluster remain in stable code format.

Preferably, when combining together features in a UI, an internal scraper is employed to minimise disruption to coding by identifying features which disrupt the coding. Preferably the internal scraper allows features to be understandable for a standard aspect of the code structure and provide integration within the system for re-use. Preferably, the scraper automatically adjusts and/or requested the user to make adjustments in respects of features which disrupt the coding. Preferably, the internal scraper is adapted to recognise combinations of related features, and adopts and/or makes available for user selection or validation features which are consistent with a recognised style or theme across the UI and which are less disruptive. The internal scraper may operate numerous times throughout the steps involved in the UI generation process to minimise breaks or disruption in the coding.

Preferably, one or more resolvable feature(s) are provided with a corresponding dynamic coding to permit improved stability of coding as the UI generation process is followed.

The code may be provided or generated by applying an interactive visual theme or architecture that is well structured to be used and understood by the users (in particular, those users with a developing background), and able to provide associated documentation. The architecture of the frontend code for a project may be a theme without backend development but with interactivity, code and documentation for deployment. Preferably the code is provided in a form suitable for further backend development.

The resolution of one feature by the trainable algorithm may affect the likelihood of resolution of another feature.

The same, or a related, label may apply across a plurality of features in a plurality of dataset entries.

Cross-feature labelled dataset entries are preferably weighted for increased resolution during processing of input.

The formed UI may include resolved and related features.

One or more of the algorithms is preferably able to be parallel processed by a multi-core CPU or GPU.

The training of one or more of the algorithms may produce a trained model or combination of models.

The trained model or combination of models may be evaluated by an accuracy estimation technique, such as the Holdout method.

The trainable text processing algorithm is preferably able to respond to text input provided by the user to suggest one or more project tasks to the user to assist generation of the UI.

A project task may include seeking further input from user using questions, and then processing a user's response to these questions.

There may be provided a further step of communicating and/or delegating the tasks to third parties.

Project specific documentation relating to the particulars and the progress of a UI project may be generated for communication to a chatbot for, inter alia, user interaction, project management and task creation. The generated documentation itself is subject to processing by the method so that patterns or other features within the documentation are resolvable. The documentation provides support to the user so that, after the method has resolved preferred patterns of engagement of users in a group, workflows, etc., a novice user can engage in an enhanced or simulated group environment with an enhanced or simulated administrator, project manager, collaborator(s) and/or third party(ies). The enhanced environment provided by the method of the invention is responsive to user input such that features presented or suggested to the user are enhanced by the previous activity of user in prior projects.

In a particularly preferred form, the enhanced environment permits a user to input a diverse range of material such as natural language, images or project documentation, and present and ultimately generate a UI which has high fidelity to user input. The enhanced environment provides viewable prototyping and a quality assured and practically functional end product, including a stable deployment ready form. The enhanced environment further provides high levels of engagement for a group of users.

Ratings may be applied to a UI, or features of a UI, uploaded by a user, and in particular, a project initiator or collaborator. Rating can be applied to any one or more of the parameters.

The ratings may include the results from one or more of, or a combination of, the following:
a. a rating algorithm which measures the features of the UI, by assessing the uniqueness of the features the UI by comparison with the dataset;
b. comparative peer review;
c. related activity on social media.

There may be provided means for interfacing with one or more third party system(s) (e.g. a digital assets hub or repositories). The third party system may include third party integration. The third party integration may be by means of API, and can include separate solutions.

A user may receive credits or tokens for contributing creative material to, or otherwise contributing to, the dataset. Credits or tokens may be issued to a user as a reward for making a contribution. The tokens may be purchased by a user. Credits or tokens may be received by a user interfacing with a third party system in a manner which contributes to the dataset.

A chat bot or external application may be used to prompt the user to supply further input. The external application can use the methods described herein to create a link to provide a UI with an interactive experience with a link to an external third party, for example to seek guidance, assistance or to share information.

The chat bot or external application is preferably trainable. Preferably, the chat bot is trainable by applying NLP or other algorithms to the dataset or to external chatbots, AR, VR systems developed based on existing UIs developed outside of the method of the invention disclosed in this patent or, alternatively, UIs generated by the method described herein).

The chatbot or external application preferably updates collaborative project parties (e.g. team members in a group of users) on activities related to their roles including project owner/manager/initiator.

The chatbot or external application may use system knowledge to translate information into technical language for a technical contributor, suggests tasks, asks and answers questions, with the appropriate depth of information depending on the contributor.

The chatbot, AR or VR, or external application is preferably connectable to the UI with minimal programming or without additional programming.

The chatbot or external application may provide pre-processed workflows with options for the user to approve and customise.

Machine learning algorithms are preferably trained based on workflows to enable the chatbot to suggest project activity.

Administrator or other human validation or customisation may be applied.

The chatbot, AR or VR may learn from the interactions between the user and the system.

The UI may include a predeveloped chatbot system, AR or VR environment.

The chatbot, AR/VR environment may include user controllable components.

The operator controllable components may apply computer vision to respond to gestures or movements by an operator of the UI.

The dataset for training the trainable algorithm preferably includes frontend code.

The trainable algorithm is preferably able to recognise an AR or VR environment in the user input or unlabelled data.

The trainable algorithm is preferably able to resolve features that are suitable for chatbot, AR or VR control.

The chatbot, AR or VR environment may include:
presentation enhancements such as graphics or charts
projection of controllable components
providing location and/or time assisted updates
for the UI user The environment may be adapted to communicate information, graphs, charts, or content from an existing website, web application or mobile application.

Preferably, the algorithm is suited to resolve text related features in multiple languages (or to translate languages) using an OCR, computer vision or other text processing algorithm known to the PSA. In particular, it is preferred that the algorithm is suited to learn element(s) (e.g. a particular group of and/or attribute(s) (e.g. a style) and/or language(s) (e.g. Japanese) that have a correlation with particular languages or regions, so that when a user uses a particular language or identifies the UI as being related to or for a particular region, language or region specific feature resolution is provided.

The trainable algorithm may include, a single, or, two or more algorithms able to operate on data sequentially (e.g. a data is processed by a first algorithm, then by a second algorithm) or in series (e.g. two algorithms process the same (or parts of the same) data in parallel).

Preferably, features which are not customarily considered to be related to a UI are able to be resolved, presented, etc.

In one or more preferred forms, resolving, presenting, generating, etc. features in relation to one or more of the following diverse range of applications are intended to be included within the scope of the application: brochures, gift cards or similar, fashion products, and in particular in relation to presenting a variety of industry targeted visual features in a proposed product for user selection and/or validation. Other contexts in which the invention may be generally applied include in the resolving of features, presentation and/or generation of landing pages, coded pages, chatbots, AR/VR project information.

Additionally, the invention the subject of this application may be applied to the following industries: document mining, recognition and classification of the content of documents, medical images (e.g. x-ray, ultrasound or fundoscopic examination) or digital maps, including GPS images (e.g. the representation of particular cartographical elements such as watercourses or parklands, or map 'styles' more generally).

In a further particularly preferred form, the trainable algorithm may be suited to resolve features in relation to product packaging. Preferably, the trainable algorithm is trainable with respect to national or international design standards with respect to packaging, which standards may be product specific.

In a preferred form, the method of the invention may be applied to improve user experience of low-code development platforms or designing programs.

Preferably, the method of the invention provides for codeless integration with chatbots, AR and VR, in particular for use in mobile applications, websites, and related contexts. Preferably, there is provided partnership API integration with a chatbot software development kit provider.

Preferably the invention provides for generation of a self-adaptable UI including features that adapt to data received by the generated UI. Preferably, data received by the generated UI is received via a communication channel which permits data transfer between the project creator and a system implementing the generation of UIs in according with the invention.

Preferably, the method of the invention includes the capability to integrate with an inbuilt or third-party wireframing platform to enable full project production. Preferably, the method includes the capability to integrate with an inbuilt or third-party program for coding of the generated UI.

Combinations of the steps referred to above are to be understood as falling within the scope of the disclosure of this specification.

BRIEF DESCRIPTION OF DRAWINGS

FIG. 3, the receiving input and resolving of features steps each including simplified schematic diagram representing the input and resolved features, respectively FIGS. 11F and 11G are simplified schematic diagrams of screens depicting an example wireframe.

FIGS. 12A and 12B are simplified schematic diagrams of a first and a second chatbot scenario, according to various embodiments

DESCRIPTION OF EMBODIMENTS

Figure 1:
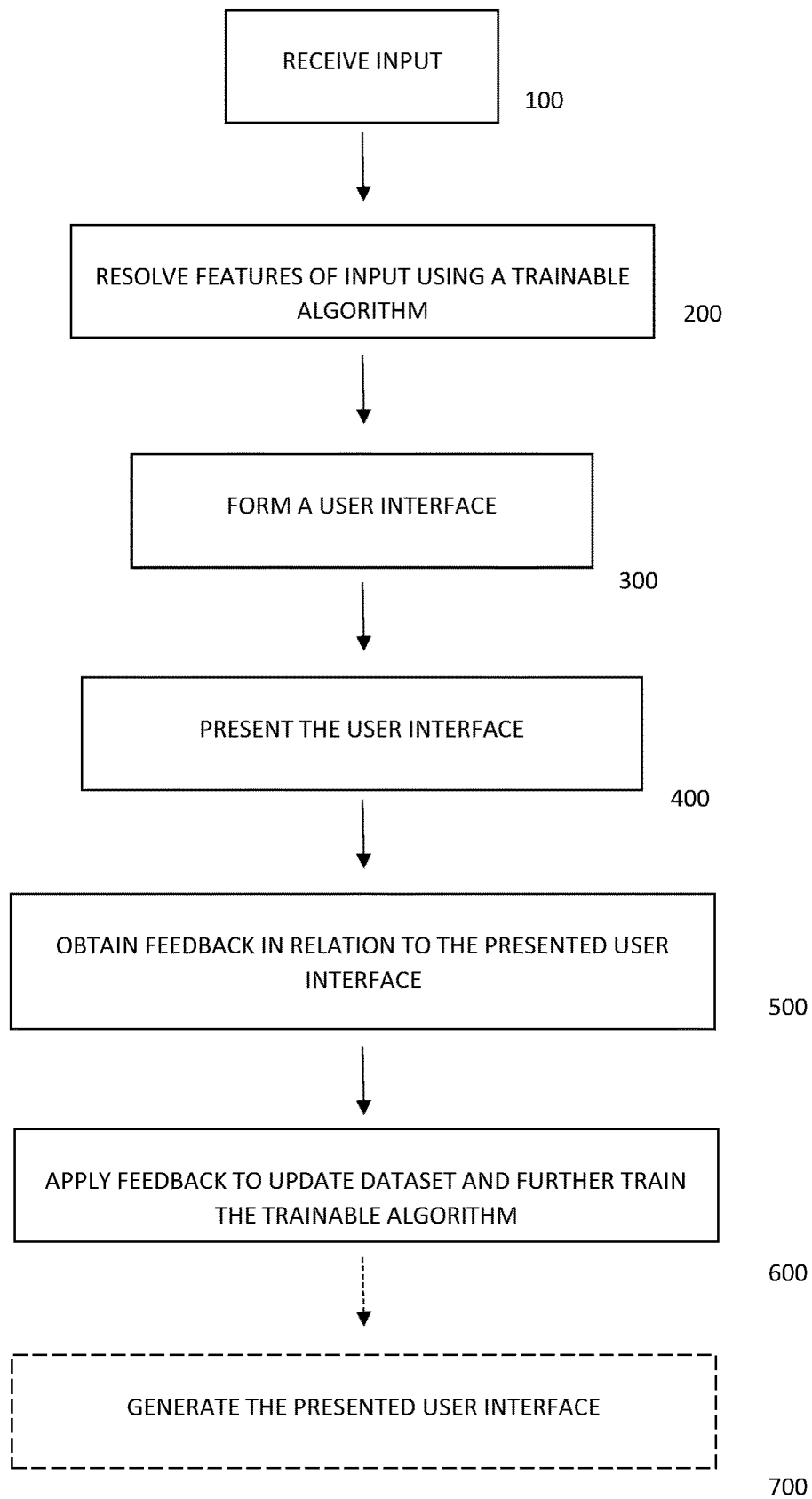
FIG. 1 illustrates a first process flowchart for an example method of using a trainable algorithm to resolve features of a UI, according to various embodiments
Figure 2:
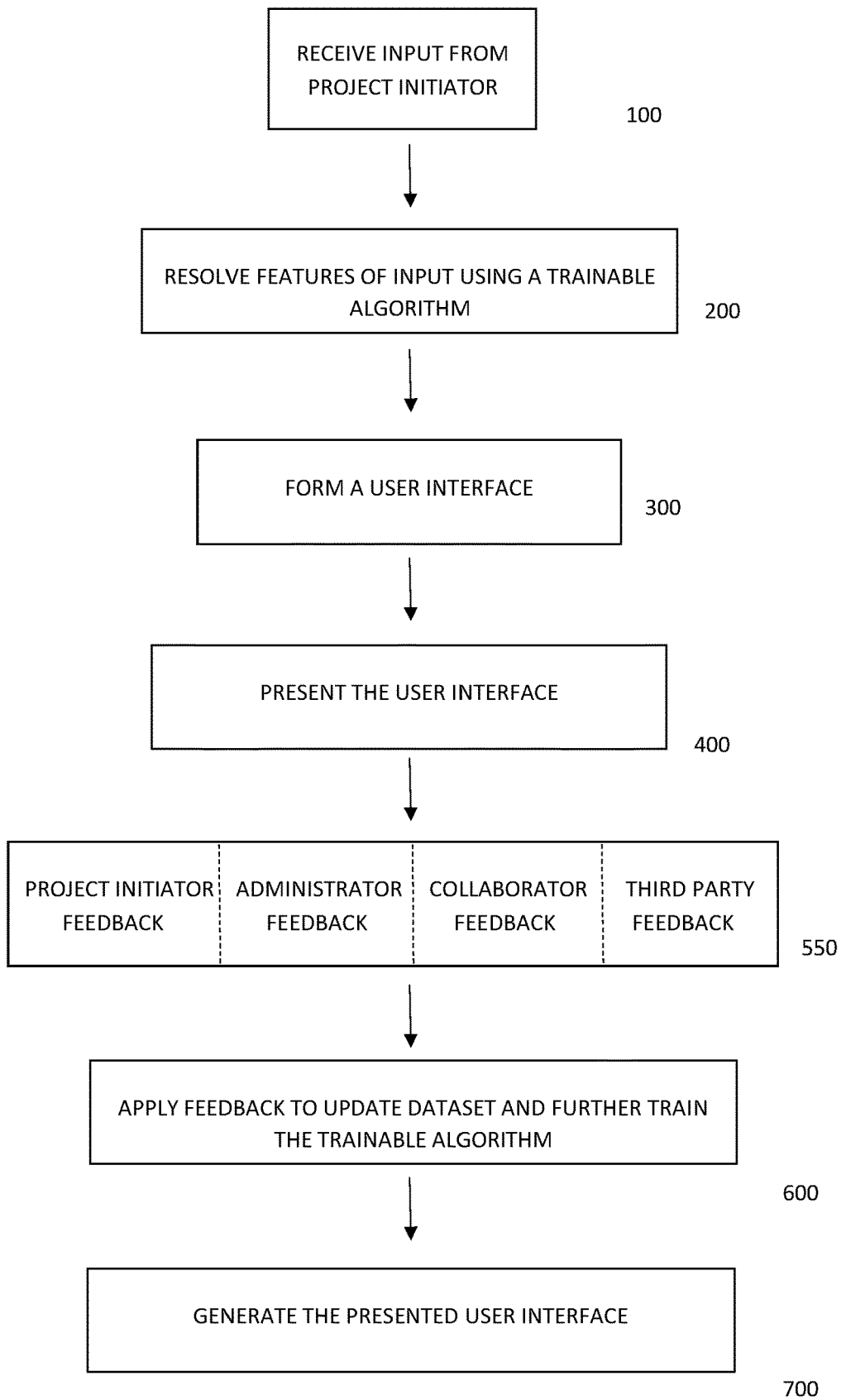
FIG. 2 illustrates a second process flowchart for an example method of using a trainable algorithm to resolve features of a UI, according to various embodiments

FIGS. 1 and 2 each depict a process flowchart for an example method of resolving UI features. There are a number of steps in each method, including the step of receiving input 100 and the step of resolving features of the input using a trainable algorithm 200; these two steps are described in detail in FIGS. 4 to 6.

FIGS. 1 and 2 also include the steps of forming a UI 300, presenting a UI 400, obtaining feedback 500 (550) and then applying feedback to train the trainable algorithm 600. These steps are described in more detail below in relation to FIGS. 7 to 11.

FIG. 1 includes the step of generating the presented UI 700 as an optional step, and this is indicated by the dashed lines around the generating UI step 700. By comparison, the step of generating the presented UI 700 is a compulsory step in the example method of FIG. 2. The generation step includes generating a stable coding of the UI in a deployment ready form (not shown).

The obtaining feedback step 550 of FIG. 2 includes the option of obtaining a diverse range of feedback, including feedback from the project initiator and/or an administrator and/or a collaborator and/or a third party.

It should be understood that the receiving input step 100 in the example method depicted in FIG. 1 may include receiving input from one or more of a number of different users, including a project initiator, an administrator, a UI creation collaborator; a third party. The input receiving step 100 of FIGS. 2 and 3 is described only in relation to receiving input from the project initiator.

Figure 3:
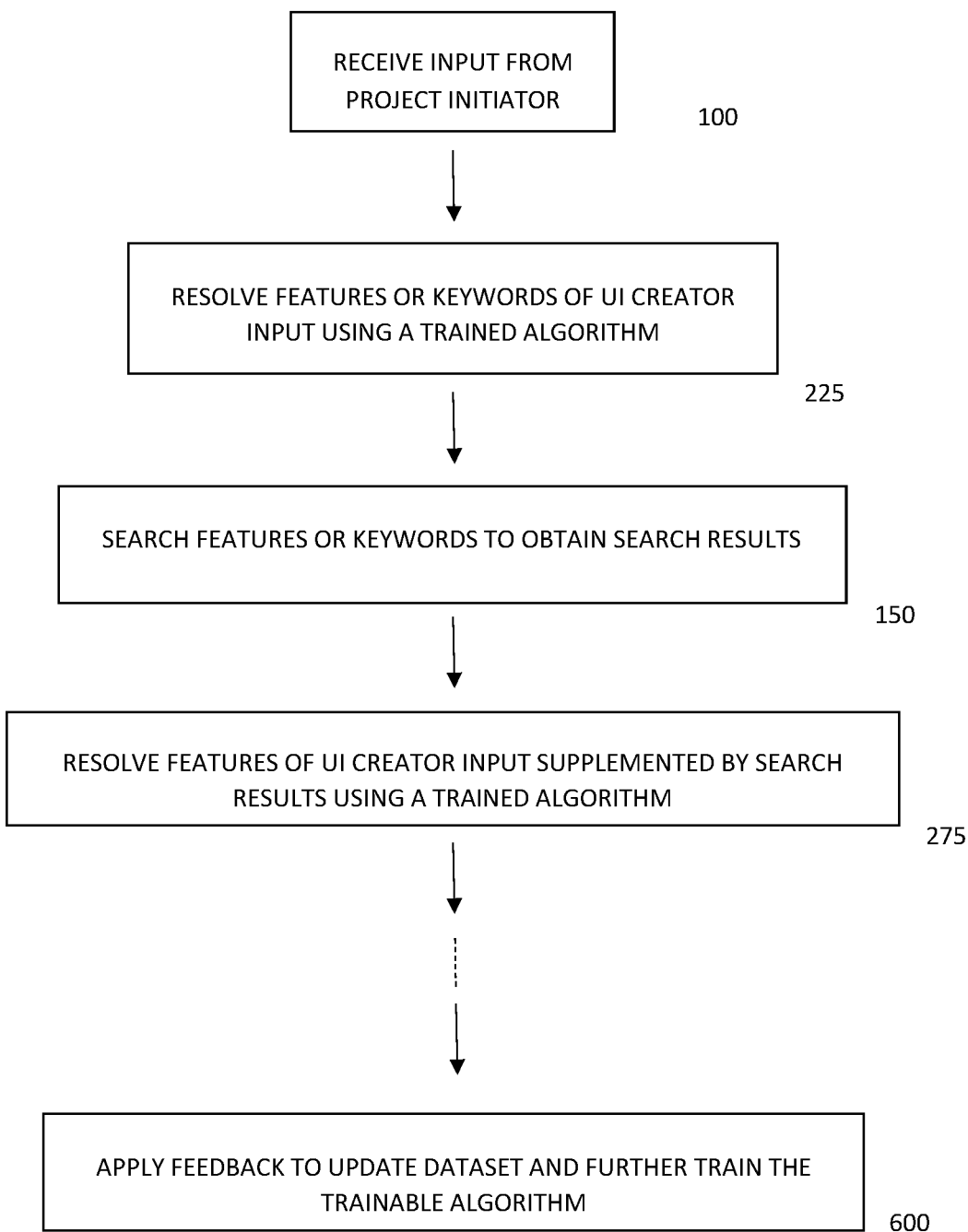
FIG. 3 illustrates a third process flowchart for an example method of using a trainable algorithm to resolve features of a UI, according to various embodiments

FIG. 3 depicts a process flowchart for an example method of training a trainable algorithm to, in the resolving step 225, resolve features or keywords of a UI from the project initiator input received in the first receiving step 100. Those resolved features are then searched to obtain search results during a searching step 150; and then the algorithm resolves the features of the project initiator input supplemented by the search results in a further step 275. The steps of forming a UI, presenting the UI and obtaining feedback are not specifically indicated in FIG. 3, however they should be considered as present in the example method. FIG. 3 also depicts the step of applying feedback 600 (including in relation to the features resolved from the project initiator input supplemented by the search results) to further train the trainable algorithm.

The applying feedback step 600 of each of FIGS. 1 to 3 involves updating the dataset (see FIGS. 7 to 9 and the description below for more detail).

Figure 4:
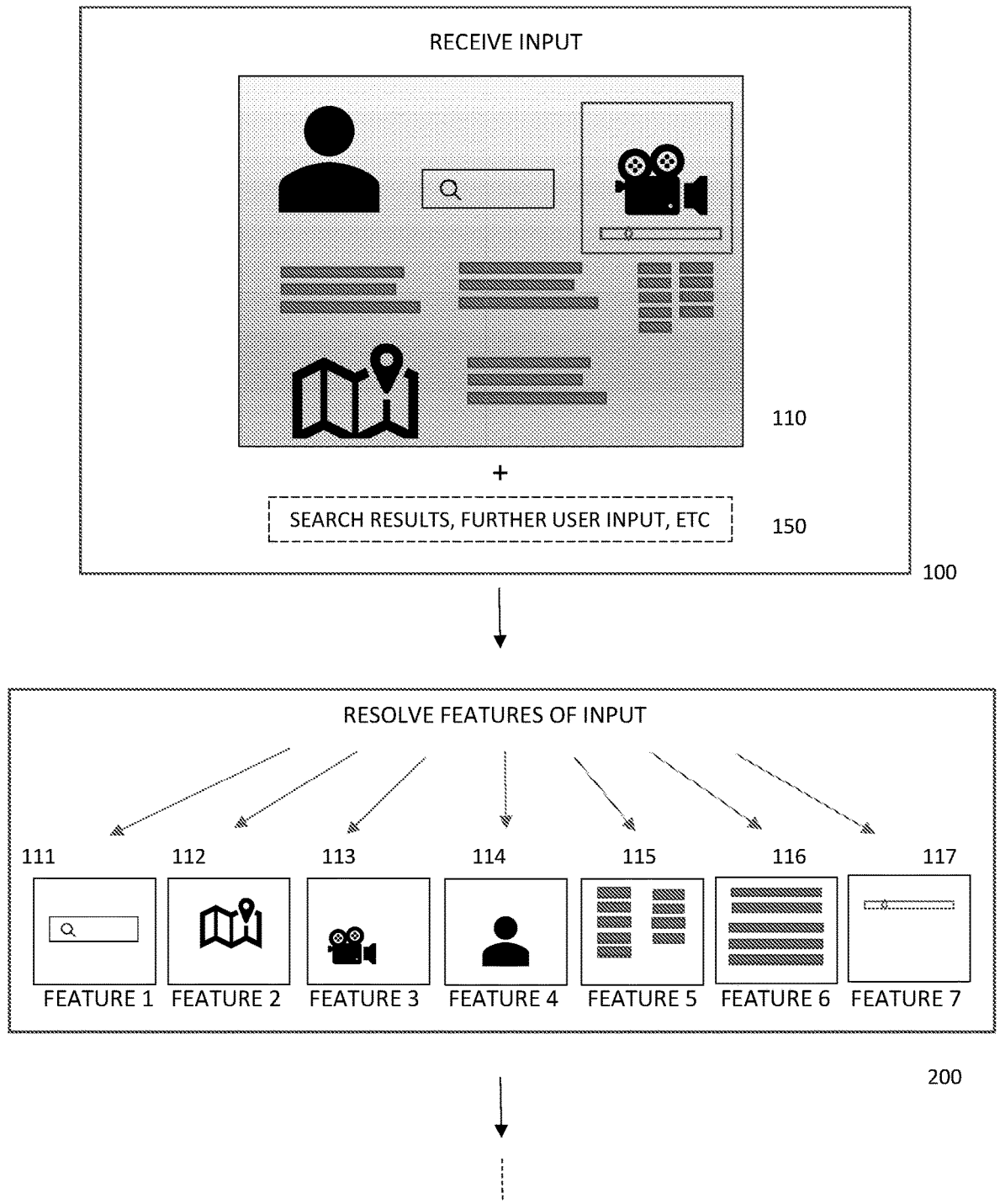
FIG. 4 illustrates a process flowchart for receiving input and resolving of features steps of an example method in accordance with FIG. 1, FIG. 2.

With regard to FIG. 4, there is illustrated a process flowchart for steps of an example method in response to particular input 110 which is depicted in a simplified schematic form. The receiving input step 100 and resolving features step 200 are each presented in FIG. 4, and the steps of forming a UI, presenting the UI, obtaining and applying feedback are not shown in FIG. 4 for the sake of illustrative convenience.

FIG. 4 includes input 110 which comprises a simplified schematic of a screenshot of a UI. FIG. 4 also includes an optional searching step 150. Once the input 110 (plus optional supplementary input 150) has been received, it is processed by the trainable algorithm to resolve features 1 to 7 of the input 111 to 117, respectively. In more detail: feature 1 (111) is a search bar; feature 2 (112) is a map element; feature 3 (113) is a video element; feature 4 (114) is a user icon; feature 5 (115) is a table and text; feature 6 (116) is a paragraph of text; feature 7 (117) is a video progress bar element.

Figure 5:
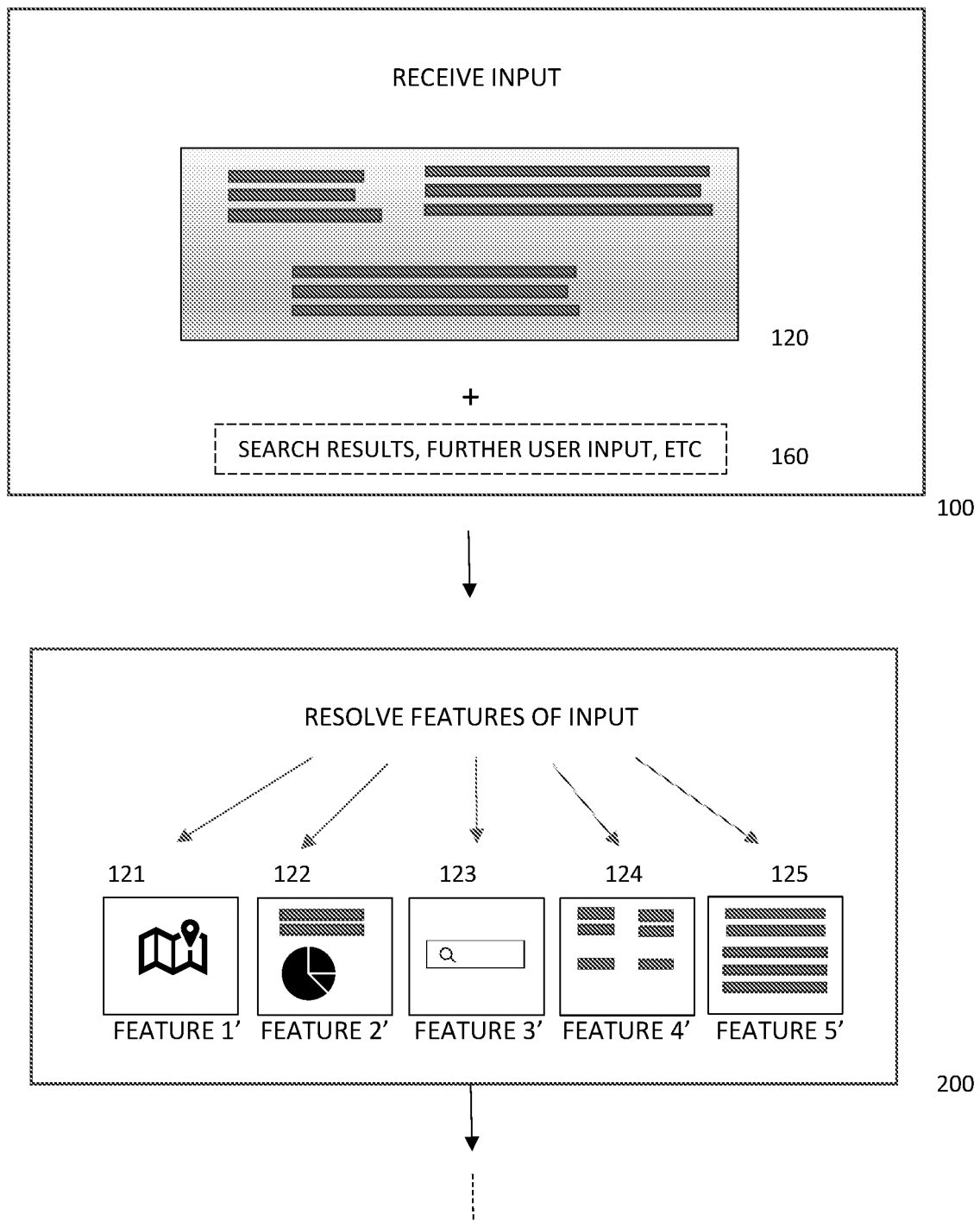
FIG. 5 illustrates a process flowchart for receiving input and resolving of features steps of an example method in accordance with FIG. 4, where the input is received in text form only, the receiving input and resolving of features steps each including simplified schematic diagrams representing the input and resolved features, respectively

With regard to FIG. 5, there is illustrated a process flowchart for steps of an example method in response to particular input 120 which is depicted in a simplified schematic form. As was the case for FIG. 4, the receiving input step 100 and resolving features step 200 are each presented in FIG. 5, and the steps of forming a UI, presenting the UI, obtaining and applying feedback are not shown in FIG. 5 for the sake of illustrative convenience.

FIG. 5 includes input 120 which comprises a simplified schematic of a screenshot of a UI containing text only. FIG. 4 also includes an optional searching step 150. Once the input 120 (plus optional supplementary input 160) has been received, it is processed by the trainable algorithm to resolve features 1' to 5' of the input 121 to 125, respectively. In more detail: feature 1 (121) is a map element; feature 2' (122) is chart element and related text; feature 3' (123) is a search bar element; feature 4' (124) is a table and text; and feature 5' (125) is a paragraph of text.

Figure 6:
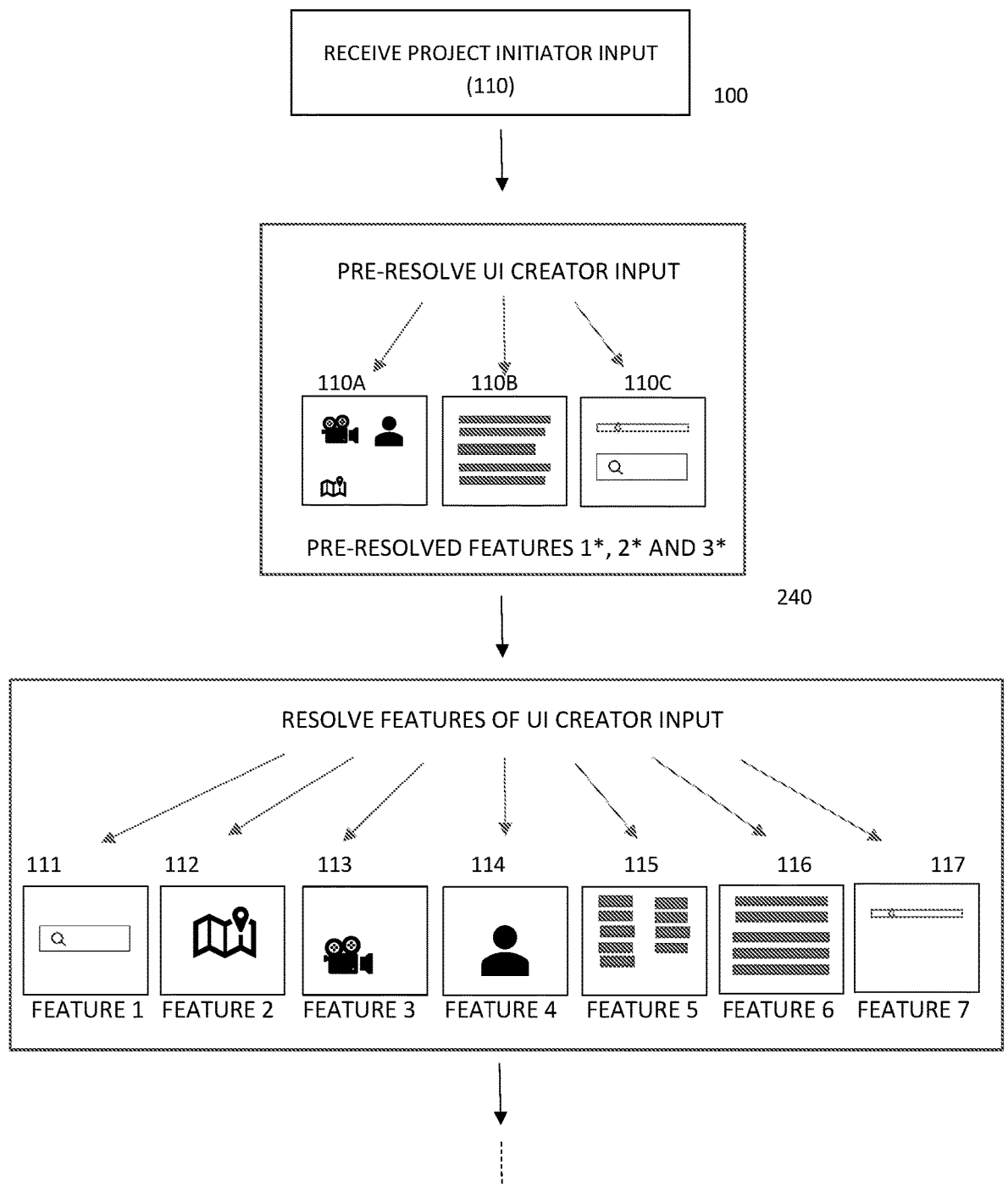
FIG. 6 illustrates a process flowchart for steps of receiving input, pre-resolving features and resolving of features of an example method, pre-resolving and resolving of features steps each including simplified schematic diagrams representing the pre-resolved and resolved features, respectively, according to various embodiments

FIG. 6 illustrates a process flowchart for steps of an example method including pre-resolving and resolving steps to resolve features of project initiator input. Firstly, project initiator input 110 (consisting of the same input as is illustrated in FIG. 4, but not shown in FIG. 6) is received at a receiving input step 100, then the input 110 is processed by a pre-processing algorithm at a pre-resolving step 140 in which features 1*, 2* and 3* (labelled 110A, 110B and 110C respectively) are pre-resolved. The pre-processing algorithm is, in this example method, not the same algorithm as the trainable algorithm.

Pre-resolved features in FIG. 6 include: a map, a video and a user icon in pre-resolved feature 1*, 110A; segments of text in pre-resolved feature 2*, 110B; and a controller and search bar in pre-resolved feature 3*, 110C.

The pre-resolving step 140, in pre-resolving the features 1* to 3*, simplifies the task of the trainable algorithm as the trainable algorithm does not need to operate as detailed or as deep processing of the input 110, and can choose to apply appropriate processing methods to more efficiently process the pre-resolved features to resolve the features 1-7, 111 to 117. While the pre-resolving process adds an extra step, it is intended that it decrease the overall time taken to resolve the features 1-7, 111 to 117 in the input 110.

Figure 7:
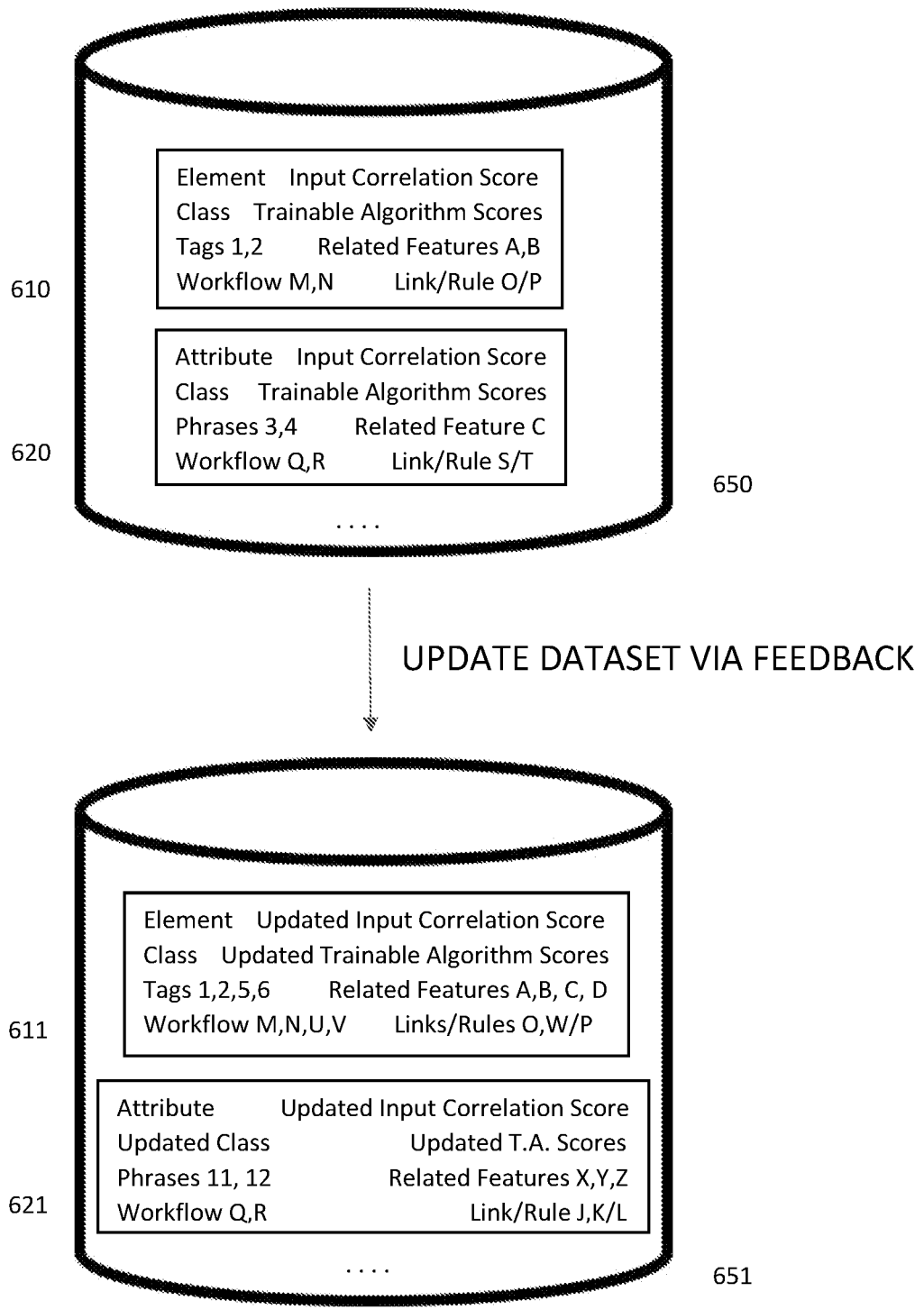
FIG. 7 is a simplified schematic diagram of a dataset undergoing an example updating step, according to various embodiments

FIG. 7 illustrates aspects of the applying feedback step 600 to update a dataset to train the trainable algorithm, and depicts a simplified schematic of a dataset 650 undergoing updating.

The dataset 650 includes a plurality of elements and attributes, just one of each of which is depicted in FIG. 7 for illustrative convenience. The feature 610 is an element having a plurality of labels, including an Input Correlation Score; Class (eg. social, sports, news); Trainable Algorithm Score; Tags 1 and Tag 2; Related Feature A and Related Feature B; Workflow M and Workflow N; Link O and Rule P.

The feature 620 is attribute having a plurality of labels, including an Input Correlation Score; Class; Trainable Algorithm Score; Phrase 3 and Phrase 4; Related Feature C; Workflow Q and Workflow R; Link S and Rule T.

Upon receiving feedback the dataset 650 is updated to form an updated dataset 651 and the following (note, not all) labels of the feature 610 are updated in updated feature 611: the input correlation score; the trainable algorithm scores; the tags; the related features; the workflows; and the Links. Similarly, some labels of feature 620 of the dataset 650 are updated in updated feature 621 of the updated dataset 651.

Each of the labels referred to above are the means by which the element 610, 611 or attribute 620, 621 is able to be identified with aspects of the input received in the input step 100. In more detail: (i) the input correlation score provides an indication, based on a history of user feedback, whether the trainable algorithm accurately identifies an element or attribute in response to input; (ii) the class of the element or attribute is the category of subject matter in which the feature is usually situated (e.g. sport, news, business); (iii) the trainable algorithm score provides an indication, based on a history of user feedback, how accurately one or more of the trainable algorithms identify the feature; (iv) the tag describes a quality of the feature (e.g. colour, shape, or text based aspects); the related features are features which are similar to the resolved (or pre-resolved) feature (i.e. of the same class, shape or size); the workflow identifies the pre-identified workflows or parts of workflows in which the feature is commonly located; the link or rule identifies how one feature is associated with another (e.g a 'log in' button may be linked to a logged in user home screen, and the rule requires acceptable username/password input for the user home screen to be reached).

Figure 8:
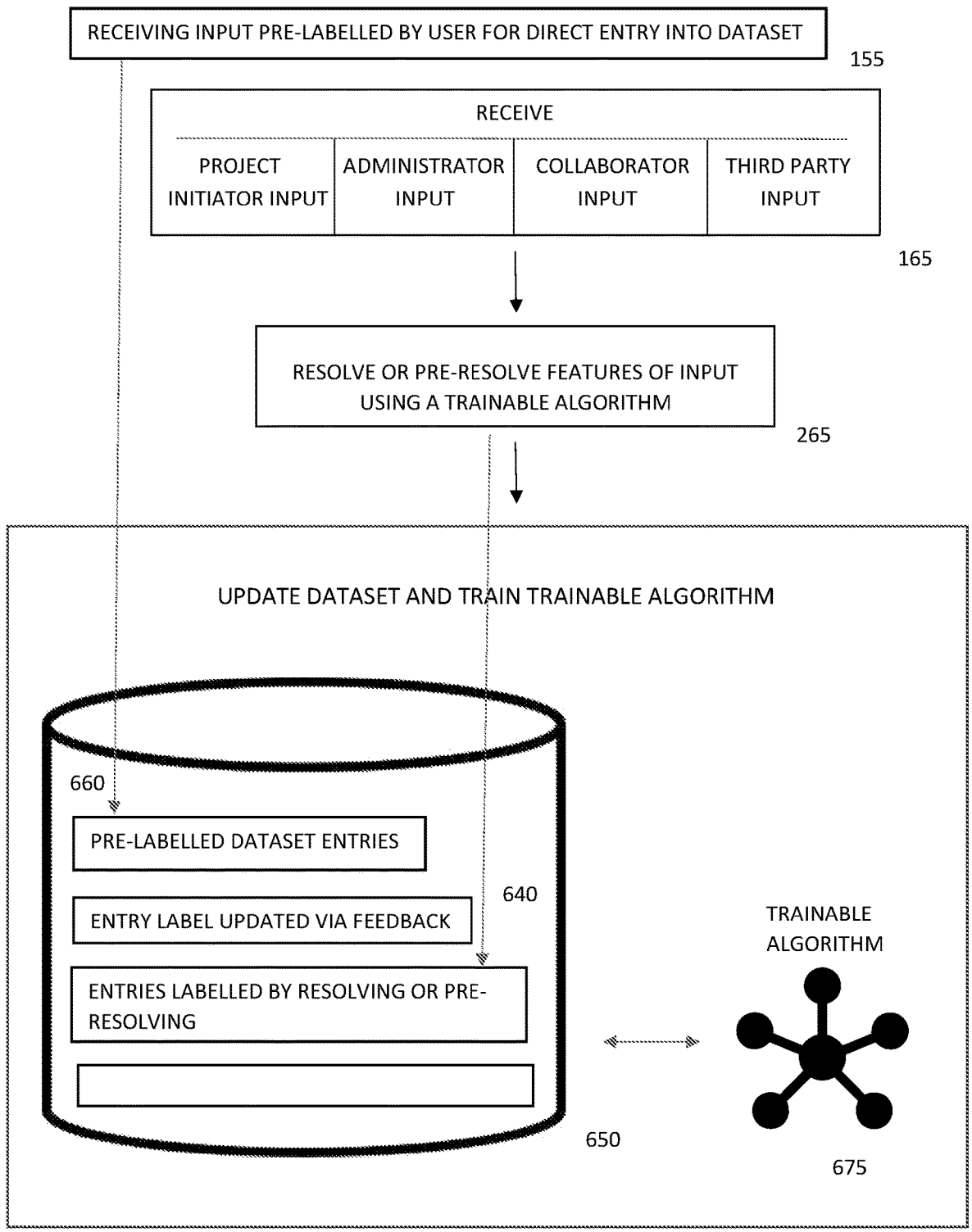
FIG. 8 illustrates a process flow chart for the receiving input, resolving features and updating dataset steps, the updating of the dataset using pre-labelled user input and pre-resolving/resolving features; simplified schematic diagrams represent a dataset undergoing updating, and a trainable algorithm, according to various embodiments

FIG. 8 depicts ways in which the dataset 650 may be updated, including via (i) receiving input 155 which his pre-labelled by a user such that it directly enters into the dataset 650 by the application of feedback (in this case initial user information) in the updating process 660; and (ii) receiving input from a project initiator, administrator, collaborator or third party 165 and resolving or pre-resolving features of the input during a resolving or pre-resolving step 265, and updating the dataset accordingly by the application of feedback (in this case, the identification of pre-resolved or resolved features) in the updating process 640. In this way, the trainable algorithm may be trained without further activity by a user (i.e. it only requires the initial provision of input by the user, and even that could be automated and applied by an administrator). FIG. 8 also depicts the dataset interacting with the trainable algorithm 675.

Figure 9:
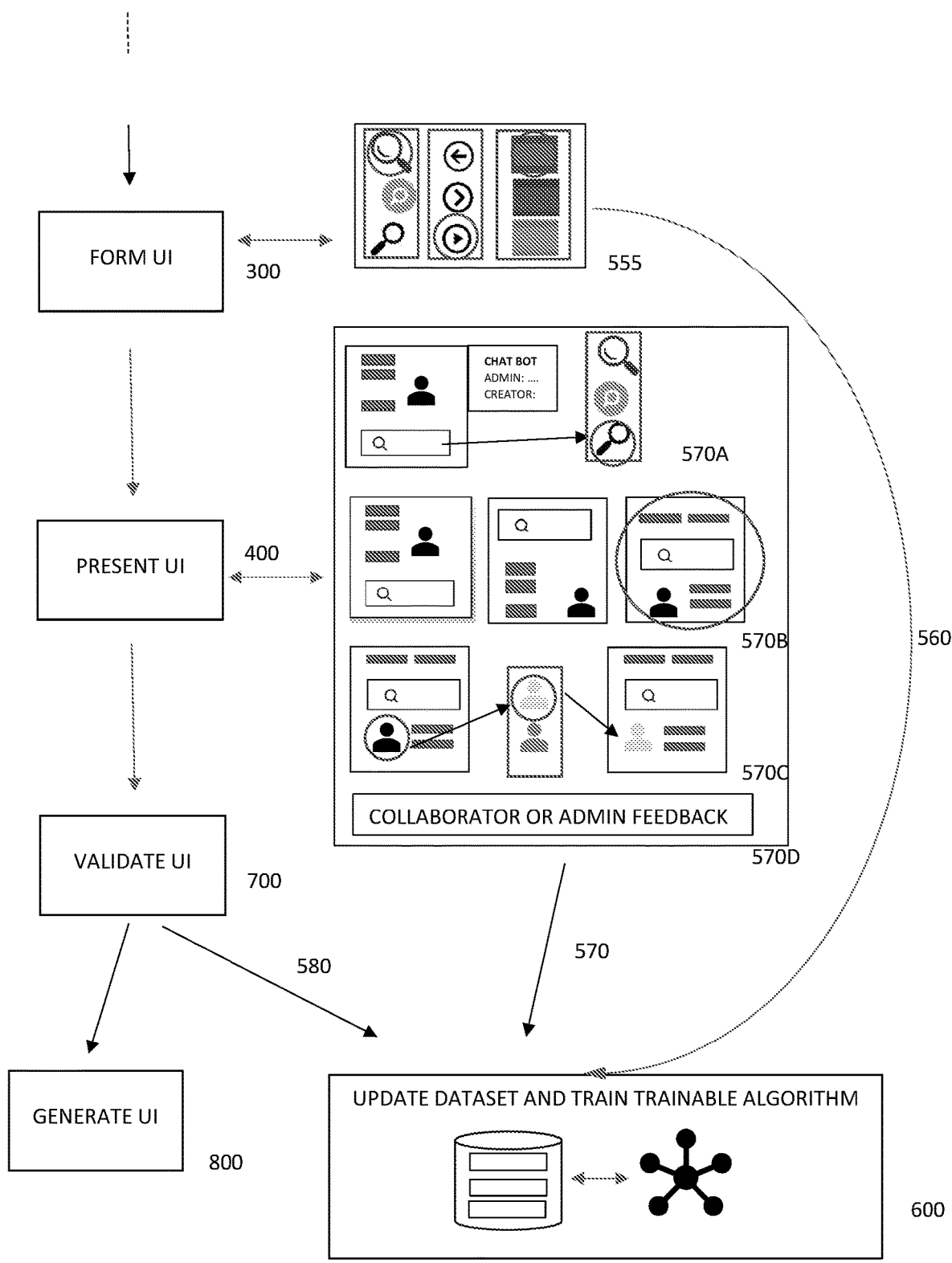
FIG. 9 illustrates a process flow chart for the forming of a UI, presenting a UI (including user selection), validating a UI, and updating dataset steps, the updating in response to user feedback; simplified schematic diagrams represent the selections made by a user, the dataset undergoing an updating and a trainable algorithm, according to various embodiments

FIGS. 8 and 9 depict a range of input which is able to be received, and which is able to be used to update the dataset for training a trainable algorithm 675.

FIG. 9 illustrates a process flow chart for the steps of forming of a UI, presenting a UI (including user selection), obtaining user feedback, validating a UI, and updating dataset steps.

In FIG. 9, feedback is obtained from three steps, including: (i) feedback 560 from the UI forming step 300 which derives from the user selecting resolved features, the selection being identified in a simplified schematic way by a circle around the selected feature, such as a search icon, play button or gradient colour background as depicted in the feature selection box 565 of FIG. 9; (ii) feedback 570 from the UI presenting step 400 derives from the user, as illustrated in FIG. 9, responding to a chatbot suggestion to select a different search icon 570A, choosing from one of three presented UI screens 570B, or user-led selection of a user icon element which is desired to be changed, selecting an alternative icon, and then viewing and approving that change in situ 570C. Feedback from collaborators or administrators 570D may be similarly obtained by presentation of a UI, or part of a UI, or a UI workflow, etc, to the collaborator or administrator, and used to update the dataset; (iii) feedback 580 is obtained from the validation step 700 by the user validating a presented (this is a pre-cursor to the UI generation step 800.

The feedback (i)-(iii) of FIG. 9 is then applied to update the dataset 650 and train the trainable algorithm 600. In more detail, each labelled dataset entry operates as a target to which the trainable algorithm can be applied to train the trainable algorithm to resolve features.

Figure 10A:
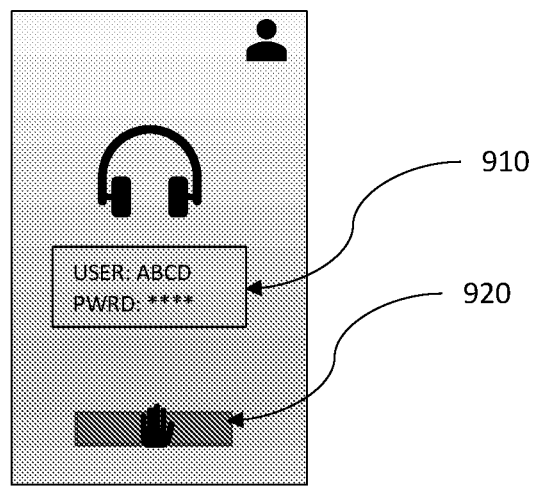
FIG. 10 is a simplified schematic diagram of three screens of an example clickable prototype presented to a user, according to various embodiments

FIG. 10 is a simplified schematic diagram of three screens of an example clickable prototype presented to a user for a music player application. The first screen is depicted in FIG. 10A, and in the first screen the user is able to click on and enter into the relevant field 910 a username and password. There is also a clickable login button 920 at the lower part of the screen, and the hand of the user is schematically represented as clicking on the login button 920.

Figure 10B:
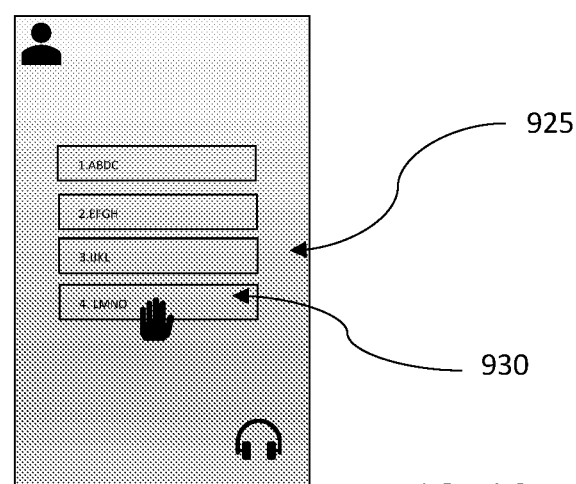

Once the user clicks on the login button 920, the user is taken to the second screen depicted in FIG. 10B. In the second screen the user has the choice of 4 different music items 925. The hand of the user is schematically represented as clicking on the fourth (lowest) music item 930.

Figure 10C:
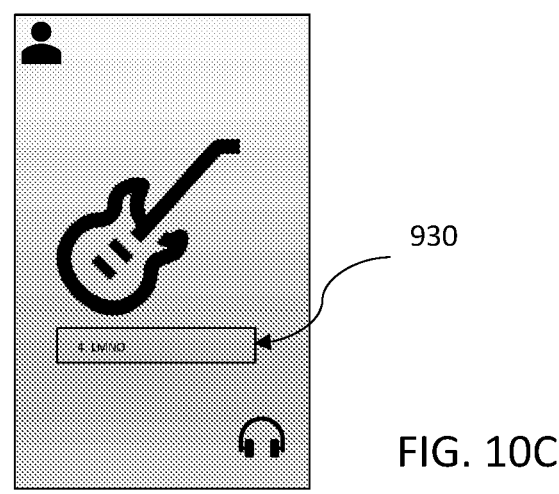

Upon clicking the fourth music item 930, the user is taken to a music item screen depicted in FIG. 10C in which additional information 940 is provided in relation to the chosen fourth music item.

FIGS. 11A to 11E are simplified schematic diagrams of screens of an example workflow. This workflow shows how the user can choose between uploading a document or other material by accessing the upload 1101 or perform a basic UI search using keywords 1102 (see FIG. 11A). Other interactive elements of the workflow page depicted in FIG. 11A include a projects link 1103 which permits the project initiator to toggle between projects.

Figure 11A:
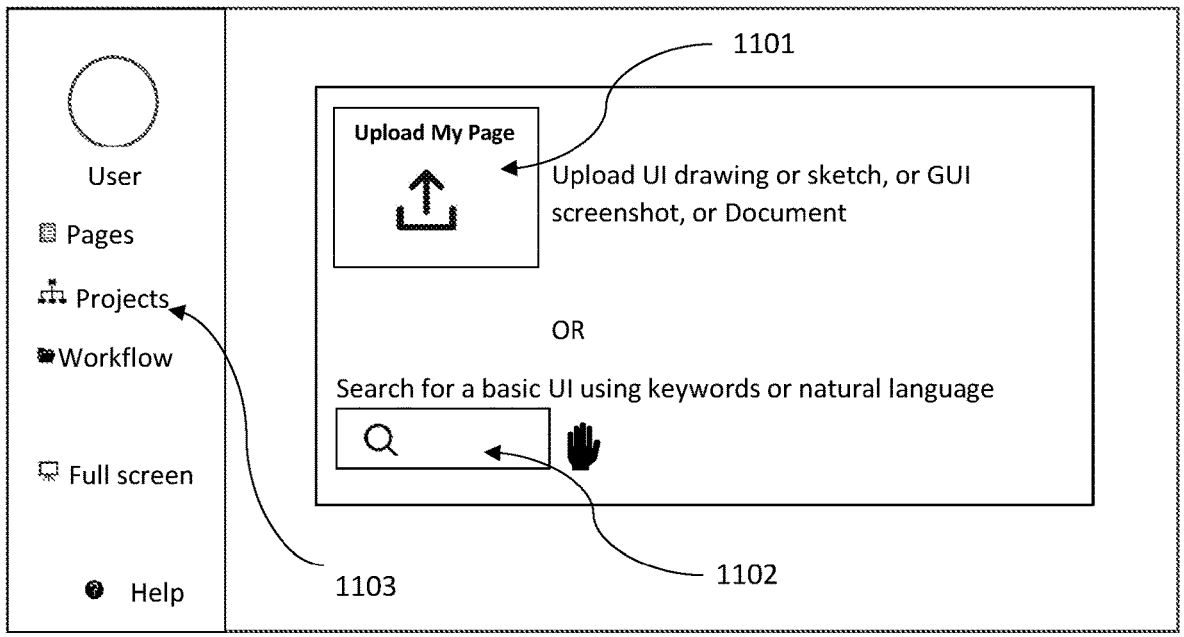
FIGS. 11A to 11G are simplified schematic diagrams of screens of an example workflow, according to various embodiments
Figure 11B:
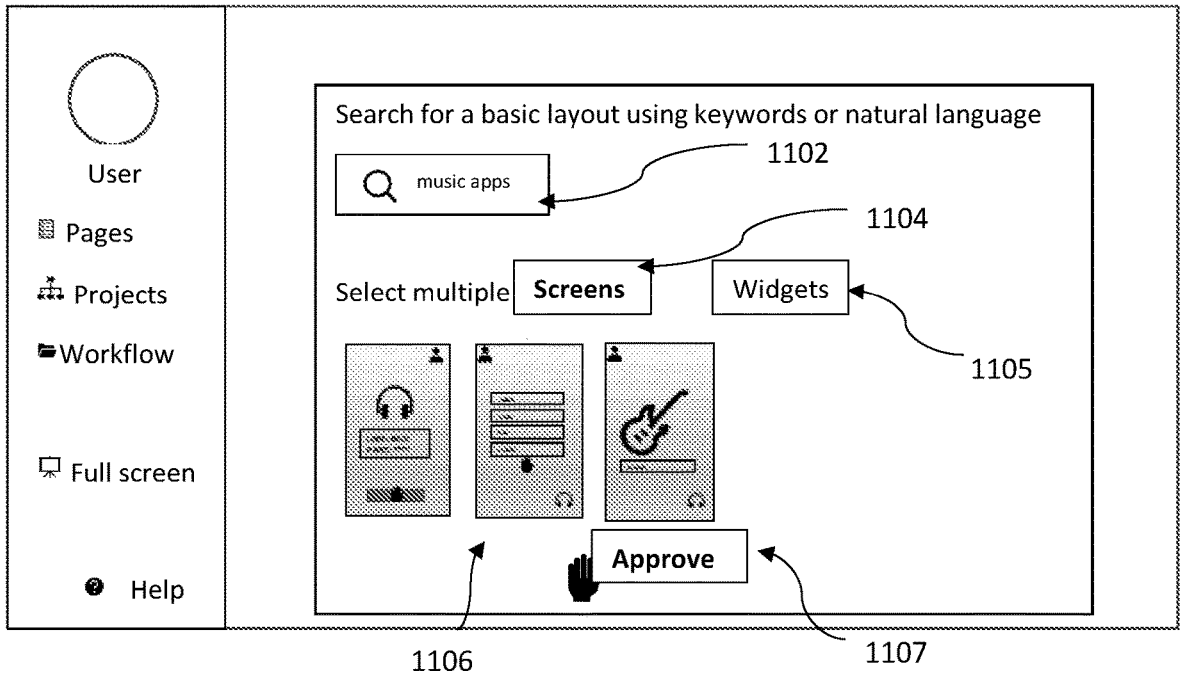

In FIG. 11B the basic layout search 1102 has been chosen and the user has entered into the search field the keywords "music apps". The receiving step may include prompting the user to answer questions or to enter particular information (not shown). The prompting is activated where a quality or score of the presented results is assessed to be weak or low by a system implementing the invention.

The user would then have the option to choose one or more of the screens and/or widgets presented to them, by choosing the screens tab 1104 or the widgets tab 1105. The user on this page has chosen to view screens by clicking on the screens tab 1104 and three screens which the user has selected 1106 are shown. The user can indicate on this screen that they approve the selections 1105 by clicking on the approve tab 1107 and the system will recognise this approval and update the project accordingly (e.g. by presenting those screens to the user for enhancement and/or user led modifications during subsequent steps).

Figure 11C:
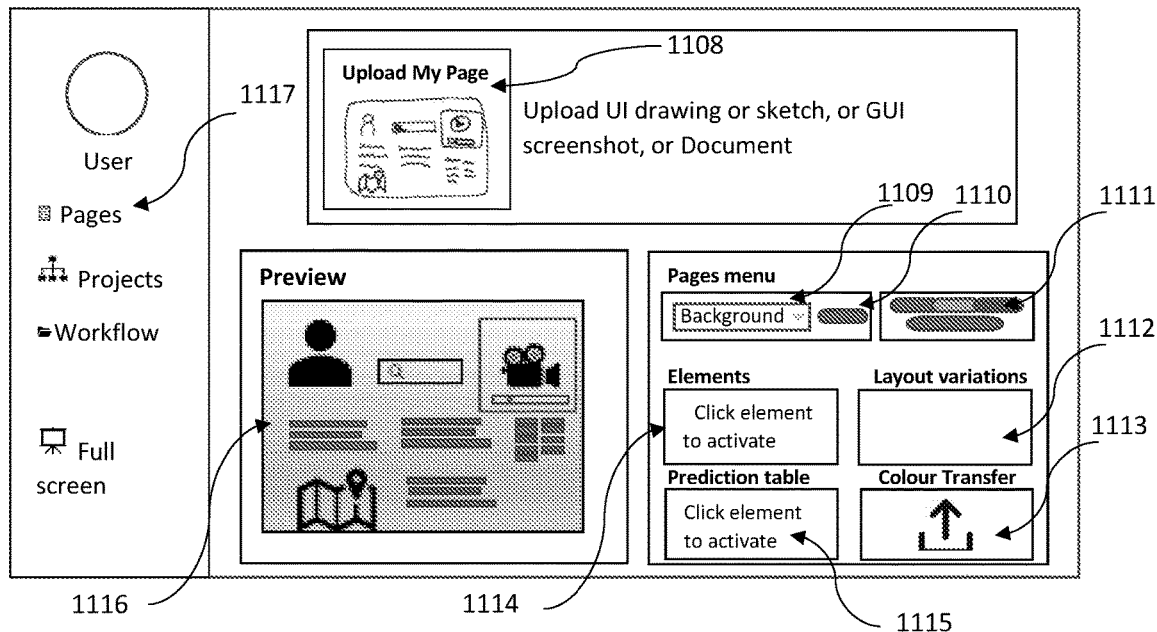

Alternatively, the user may choose to upload a document or other material, and uploading of a hand-drawing of a UI 1108 is shown in FIG. 11C. The user is presented a preview of the UI screen 1116 which includes the features resolved by the trainable algorithm in response to the input of the hand-drawing 1108. The user also has a variety of options to interact with or customise the presented screen, including a pages 1117 menu to swap between pages, colour menus 1109, 1110 and 1111 which permit adjustment of colour schemes, colour layers (e.g. foreground, background, colour gradients), element menus 1114 in which particular elements may be selected for customisation, and a prediction table 1115 which provides the user the ability to adjust a plurality of features (see FIG. 11D). Colour transfer 1113 also permits the user to upload their own colour or colour scheme into the project. Layout variations 1112 are also features which can be modified, typically with the user being presented for selection a number of layout options (not shown).

Figure 11D:
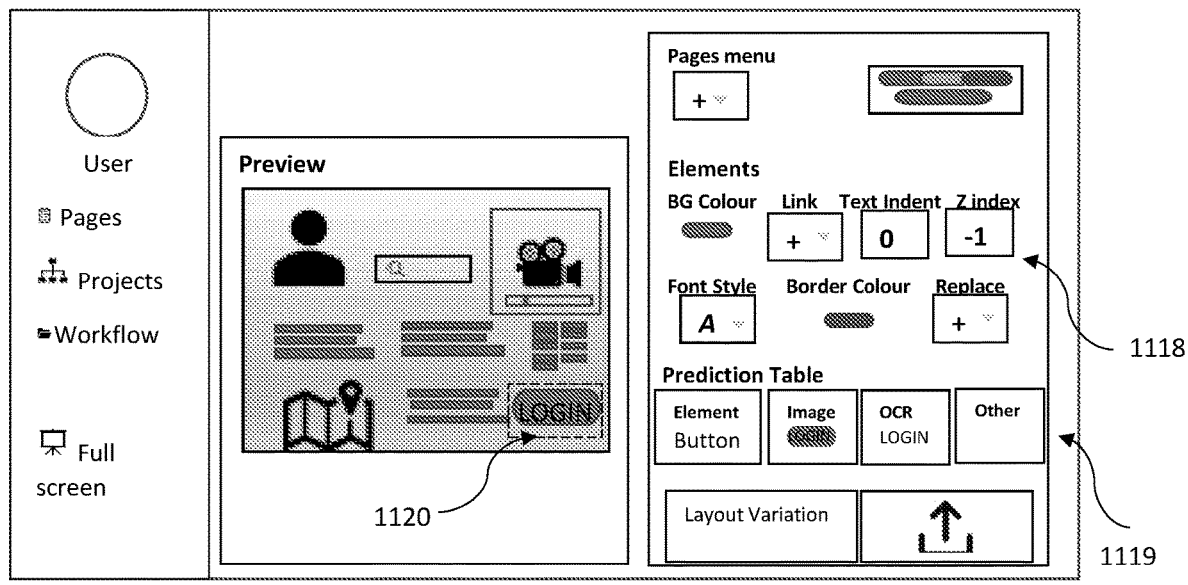

In FIG. 11D the user has chosen to modify a LOGIN button 1120, which is indicated as being a feature chosen for modification by the dashed box which surrounds the button. In the elements modification options 1118 the user may vary items such as the background colour of the chosen element, add a link between the chosen element and another page (see the wireframe in FIG. 11H for more detail), change the text indent and Z index, font style, border colour and/or choose to replace the chosen element with another. In the prediction table 1119 the user is able to modify the basic features of the chosen feature, in this case the button element. As is shown in FIG. 11D the type of element may be modified (e.g. change from a button to an icon), different images may be selected, the text may be modified or a variety of other controls such as adding enhancements such as AR or VR features.

Figure 11E:
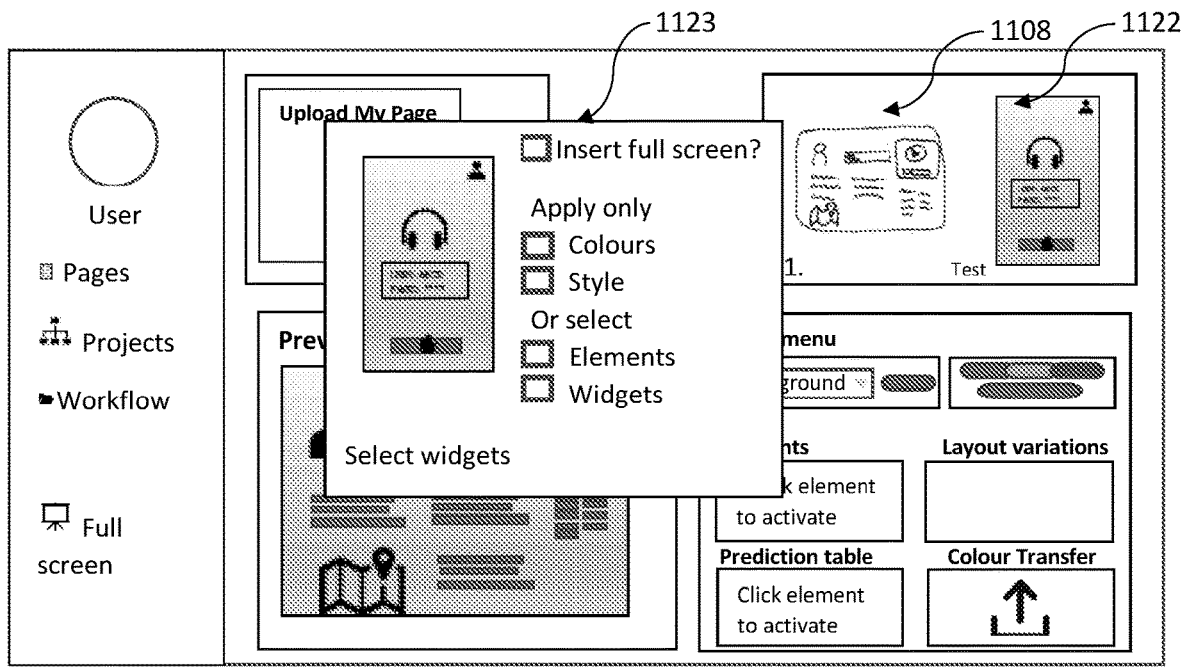

In FIG. 11E it is shown that two inputs may be provided, including a first uploaded hand-drawing 1108 and selected additional test screen 1122, selected features of which may be added to the UI as shown in the pop-up box 1123. Those selected features will be added to the page already under development based on the hand-drawing input 1108 (and/or a second page may be formed based on the additional test screen). In this way a user can combine selected or otherwise acceptable features of one input, with selected or otherwise acceptable features of a second input.

Figure 11F:
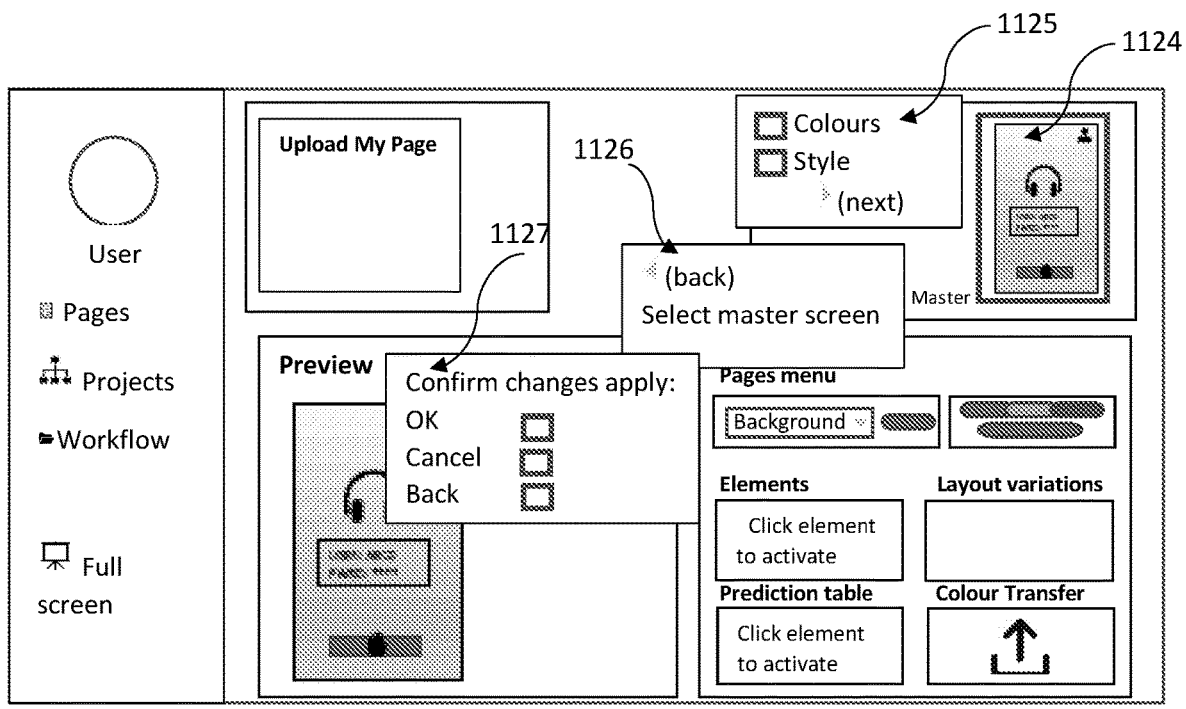

In FIG. 11F there is depicted a chosen master screen 1124, which may be toggled between a variety of screens (not shown) and the user may choose features in relation to each in accordance with their preferences via a series of pop up boxes 1125, 1126 and 1127. The selected changes of each then appear in the preview section.

Figure 11G:
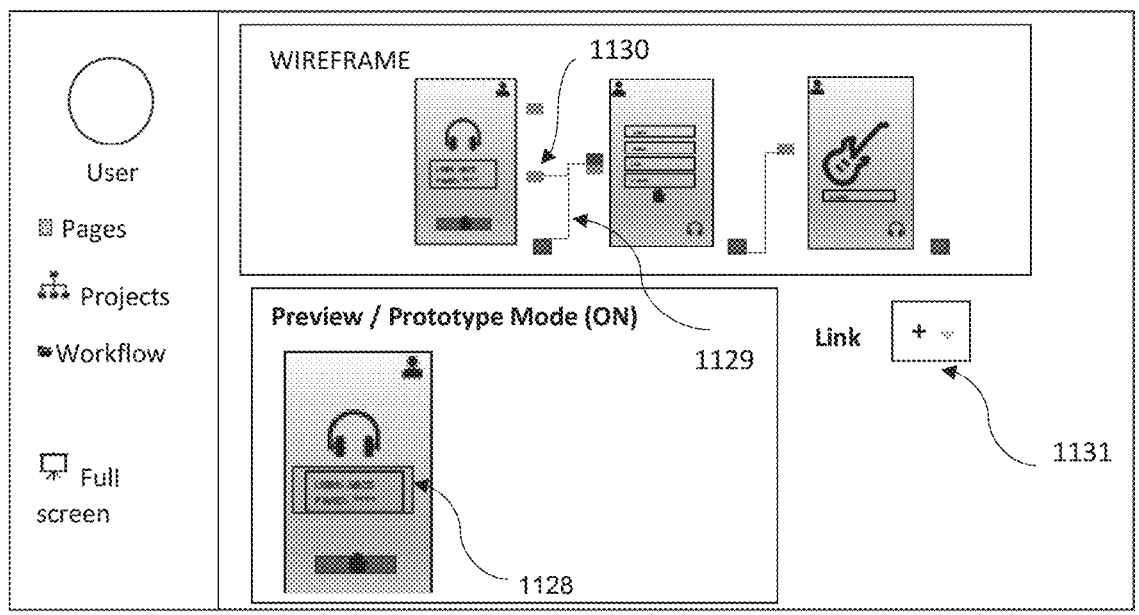

In FIG. 11G there is depicted a series of four screens which are connected in wireframe, which wireframe indicates which elements of which screens are linked to another screen. Such links may be added by the user using the link tab in the elements modification options (see FIG. 11D). In FIG. 11G the username and password fields are indicated as highlighted in the preview/prototype presentation 1128, and in this illustration there are two links 1129 and 1130 between the leftmost screen and the middle screen in the wireframe view, such links having been chosen by the user by application of the link tab 1131.

It is noted that the wireframes and UI workflows provide visual tools that are preferred by experienced designers, developers and project managers. Providing these visual tools as part of the method of the invention, while optional, ensures that those more experienced users can effectively operate as part of a group project which may include more novice users (e.g. first time UI project initiators).

FIGS. 12A and 12B are simplified schematic diagrams of a first and a second chatbot scenario. FIG. 12A depicts a chatbot interaction between the 'System' and a person (Nick) who has little experience in IT and/or with UIs. FIG. 12B depicts a chatbot interaction with a person (John) who works as a business analyst in an app development company. John wants to initiate a project with a client of his.

As is shown in the text of FIGS. 12A and 12B, the 'System' chatbot is able to provide assistance to the user in a variety of ways, including guidance, requests for more information and collaboration suggestions, which are tailored to the user's experience or background.

Figure 13:
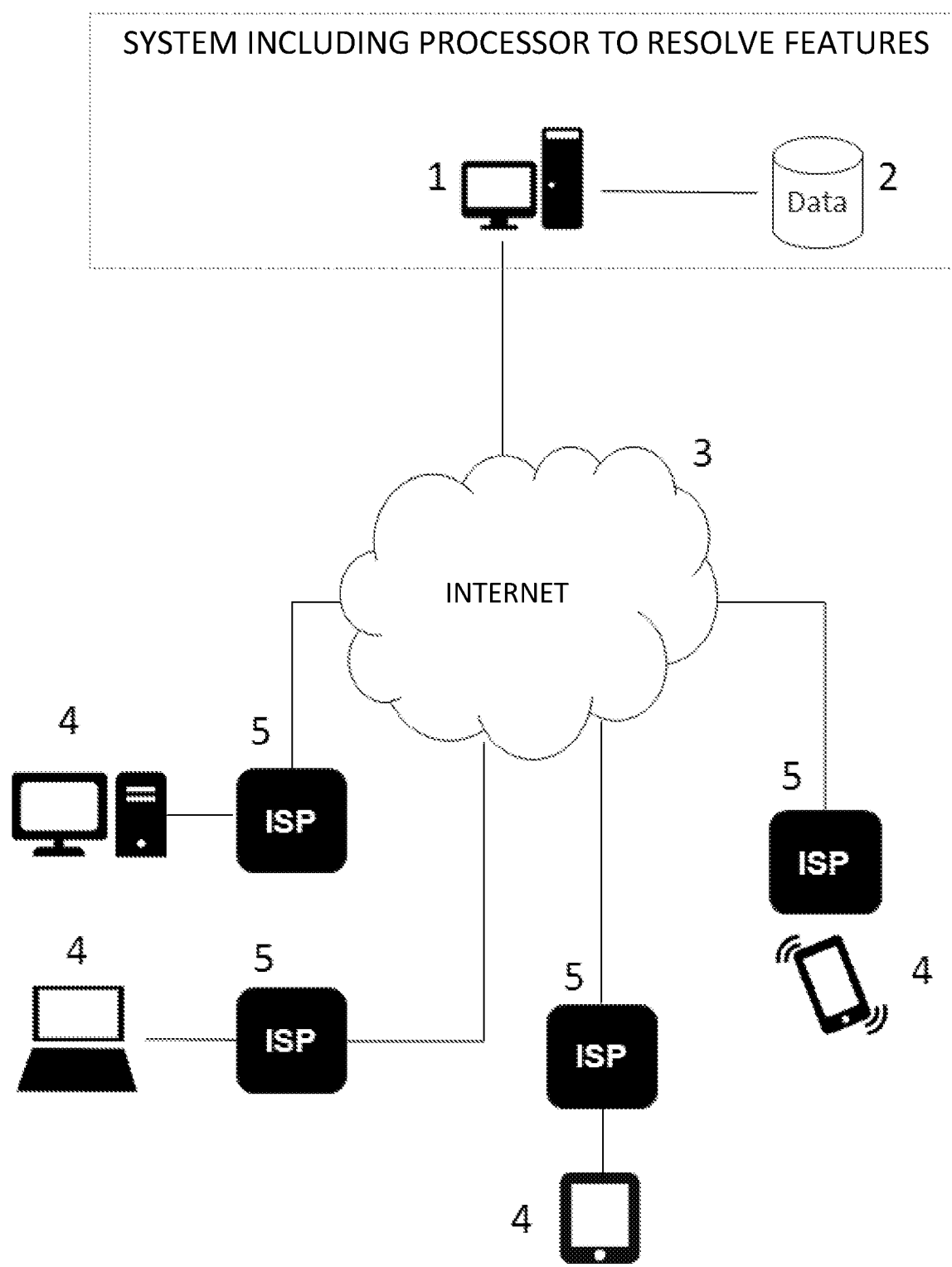
FIG. 13 is a is a schematic diagram of hardware components of an example system for using a trainable algorithm to resolve features of a UI.
Figure 14:
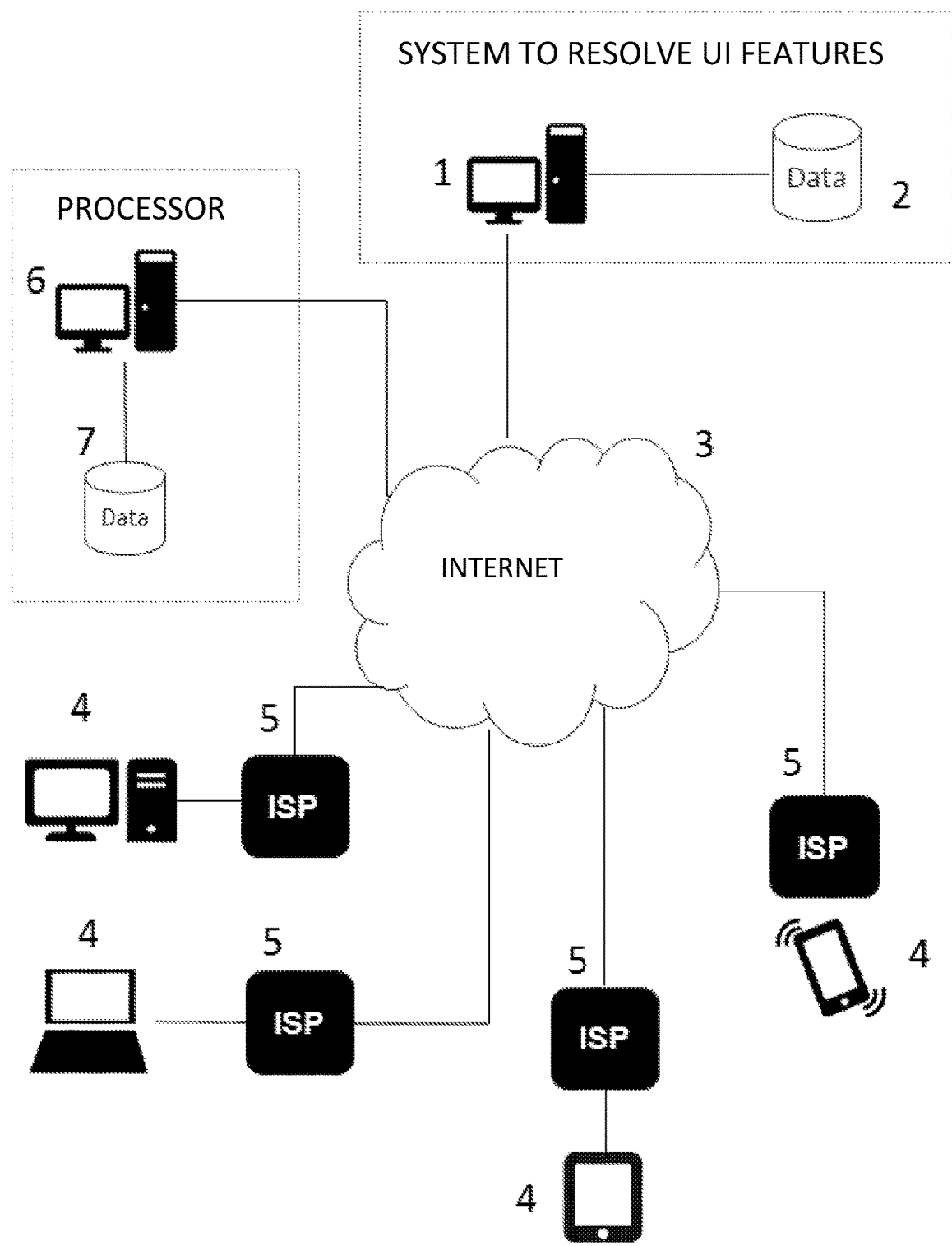
FIG. 14 is a schematic diagram of an alternative architecture of the system depicted in FIG. 13.
Figure 15:
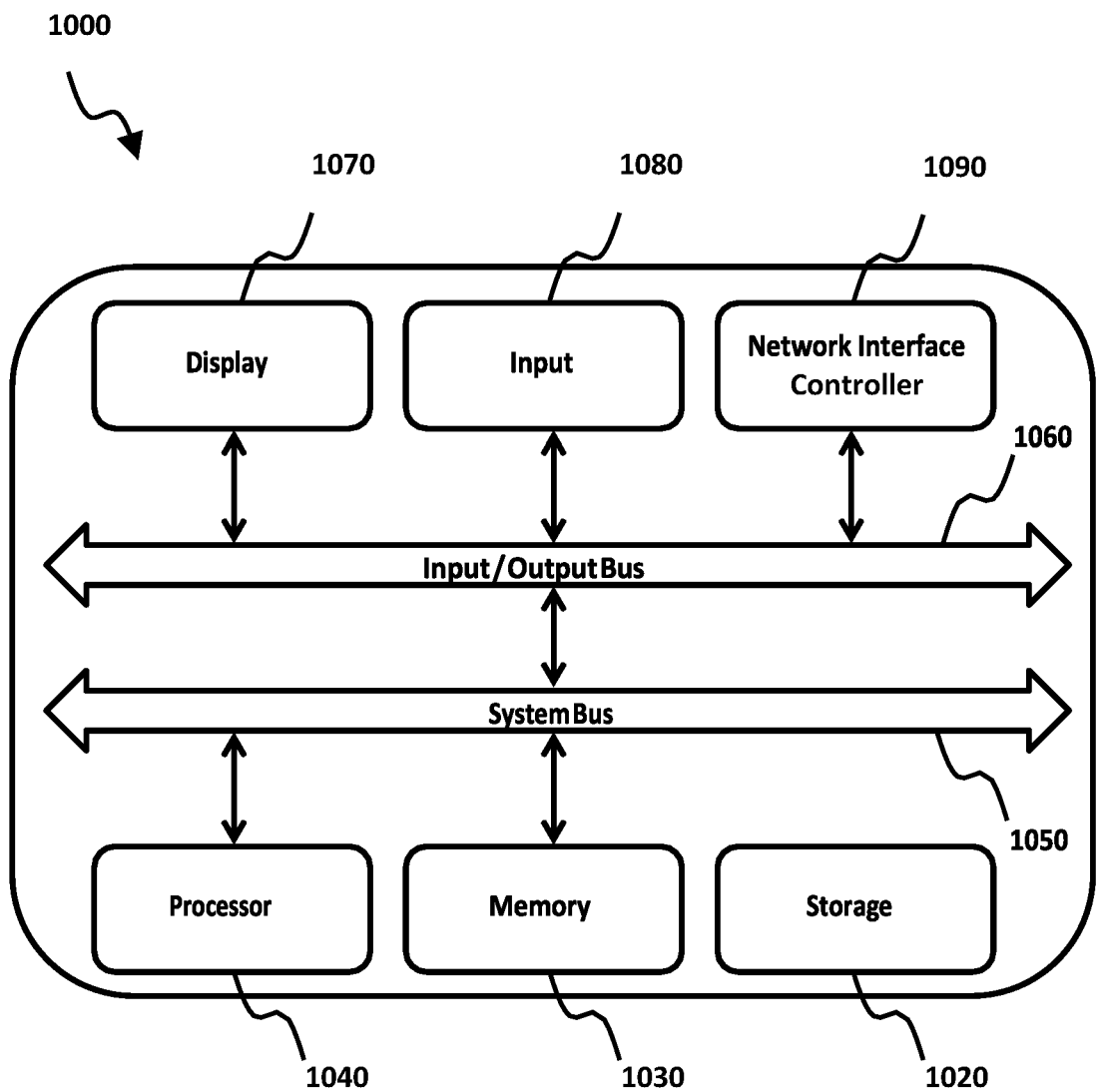
FIG. 15 is a schematic diagram of a generic hardware architecture—at the physical level—that can be generally used to implement hardware components of FIG. 13.

FIG. 13 is a is a schematic diagram of hardware components of an example system for using a trainable algorithm to resolve features of a UI. FIG. 14 is a schematic diagram of an alternative architecture of the system depicted in FIG. 13. FIG. 15 is a schematic diagram of a generic hardware architecture—at the physical level—that can be generally used to implement hardware components of FIG. 13. FIGS. 13-15 are described in more detailed below.

Server Overview

FIG. 13 depicts hardware components—that is, at the physical level—of a server 1 as described herein. The server 1, contains the processor 6 for performing the steps of the method. As an example, the server 1 may be a server machine running a Microsoft Windows™ operating server, connected to a back office database 2, for example a SQL relational database server.

An alternate configuration is shown in FIG. 12, in which the server 1 sends requests and receives acknowledgement and other data from the processor which resides on an external server 6 with its own database 7. As an example, database 7 may be hosted by an external agency, and is accessed by the server 1 over a secure Internet connection.

The server 1 is connected to the Internet 3. The server is accessed over the Internet 3 by a plurality of user devices 4, for example personal computers, mobile phones, tablets or other wearable mobile devices running web browser software such as Google Chrome™ or Apple Safari™ and using fixed or mobile broadband, wireless hotspots, satellite or dial-up connections through respective Internet Service Providers 5. Access to the server 1 is restricted by, for example, a firewall and other known network security measures. The server 1 includes a web server, for example the Microsoft IIS™ web server, to serve web page requests. User interaction is permitted through screens for actions displayed on a web page.

Physical Hardware—Server and User Devices

As is now described for completeness, embodiments described and depicted herein rely upon various computing platforms used to implement the client-server architecture described particularly in connection with FIG. 1, arranged to interoperate via the Internet 3. Implementation is dependent upon development and deployment of interoperating computer programs able to be executed within respective selected computing platforms and their accompanying operating systems.

FIG. 15 depicts an architecture of a computer system 1000 in schematic form, representative of a generic computing platform suitable for implementing the described system. This architecture abstracts the physical-layer hardware details, which are differently implemented across manifestations of the server 1 and user devices 4.

The computer system 1000 includes in its principal components a storage 1020, a memory 1030 and a processor 1040, each of which is interconnected via a system bus 1050. The system bus 1050 is linked to an input/output bus 1060, which interfaces with a display 1070, input 1080, and a network interface controller 1090. The network interface controller 1090 is configured to permit intercommunications with a network external of the computer system 1000.

The storage 1020 provides a non-volatile data storage medium for storing application data and executable code, and is typically flash memory, or other data storage device such as a magnetic hard disk drive. The memory 1030 is a random-access memory used to load executable code and application data from storage 1020.

The processor 1040 executes instructions of a computer program loaded from memory 1030 by performing the basic arithmetic, logical, control and input/output (I/O) operations specified by the instructions. The processor 1040 includes at least a central processing unit, and may be supported by ancillary processing units for performing specialist functions—such as dedicated graphics processing.

The display 1070 provides a visual window to a user, who can interact via input 1080. The input 1080 in the example of a personal computer or workstation includes a keyboard and mouse. Alternatively, in the case of a tablet or smartphone the input 1080 includes a touchscreen layered over the display 1070, and responsive to input gestures.

The network interface controller 1090 provides a port for the computer system 1000 to communicate by transmitting data to and receiving data from a network (not shown, though will be the Internet 3), and implements electronic circuitry required to communicate using a specific physical layer and data link layer standard.

The network interface controller 1090 is configured to interoperate using wired standards such as Ethernet or Token Ring, or wireless standards such as provided by the IEEE 802.11 Wi-Fi standard, or ITU-R 4G cellular standard. This provides a base for a full network protocol stack, which permits large-scale network communications through routable protocols, such as Internet Protocol (IP) over the Internet 3. Connection to the Internet is typically mediated via a firewall server or proxy server.

The client-software architecture implements a particular software design and architecture, distributed amongst both server 1 and user devices 4. Processing is conducted cooperatively as required though principally at the server 1, with some minimal processing executed at the user devices 4, and local data caching and synchronisation with the server 1.

An application at the user device 4 includes, a presentation layer, or user interface, an application layer, and a data layer is implemented by computer programs installed and executing are deployed. Software implemented at the server 1 includes one or more server programs executing by the server 1 within the server operating system. These server programs implement domain logic, which encodes how data can be created, displayed, stored, and changed, as contrasts with the remainder of the software comprising application logic which is primarily concerned with lower-level details of managing a database or displaying the user interface, system infrastructure, or generally connecting various parts of the program.

Software implemented at the user devices 4 vary according to computing platforms, but may be implemented as stand-alone apps (for smartphone or tablets, which tend to rely upon a touchscreen for input) under mobile operating systems or stand-alone applications (for laptops or personal computers) under desktop operating systems. Regardless of the computing platform, dedicated web browsers can be used to implement a web application via scripting executed by the web browser, under both mobile or desktop operating systems.

Selection of suitable channels for delivery of client software, and favoured environments and frameworks for development is informed by technical requirements and developer skill set. Regardless, client software is designed to present a user interface and application logic, as described in further detail herein.

Summary and Benefits of the Invention

The method of the invention provides for the use of one or more trainable algorithms (e.g. computer vision, OCR and NLP) to resolve UI features of user uploaded input by identifying in the user input a dataset entry labelled with said feature. After initial training, the content of the dataset is able to be incrementally enlarged as the method processes more and more user or other input, and the trainable algorithm(s) are likewise further trained with increasing use. This provides for improving the accuracy of processing by the trainable algorithms of unlabelled input via feedback derived from user interaction with the method. The features resolved directly from user input may complimented by features resolved by searching an integrated knowledge database or encyclopedia, a third party database and/or the internet, where such searching is directed by originally uploaded user input. The method provides for presenting a UI (or part of a UI) or features thereof containing said resolved features, for user validation or selection, where further user feedback is obtained for training the trainable algorithms. The method also provides for interaction amongst a group of users (e.g. project initiator, administrator, collaborator, etc) on a project of UI design, and for improved resolving of UI features based on feedback from same. The foregoing extends the functions of the method of the invention to data cleansing/processing, data mining and crawling, validation processes and methodologies described in this specification.

The invention the subject of this application delivers an improved understanding the visual and practical elements of UI design and generation. By application of an integrated dataset which expands with every instance of use of the method, and providing trainable algorithms which improve the process of resolving UI features via feedback, the user(s) engage in a more efficient process where there can be more confidence that the users purposes or goals in UI design and generation will be achieved. There is also a benefit of improved certainty as to the stability of the deployment ready form. Furthermore, the UI process is not enhanced for the project initiator alone, but also for project managers, collaborators and/or third parties, by means of improved engagement and smoother workflows. It will be apparent that the goal of the method of the subject specification the automation of as much of the UI design and generation process as possible, and it can be appreciated that the tools provided by the invention each assist in the realisation of that goal.

GENERAL STATEMENTS

It will be appreciated by those skilled in the art that many modifications and variations may be made to the embodiments described herein without departing from the spirit and scope of the invention.

For abundant clarity, when reading this specification, reference to a feature in relation to a UI should be understood as including any relevant property, part or quality of a UI as described herein, including an element, an attribute, a workflow, a link or rule between screens, user experience, user or group engagement and quality control data, UI specific related features or clusters, fluid data, just to name a selection of the aspects set out in this specification.

In particular, it will be appreciated that while the subject matter of the invention is particularly concerned with the features of UIs, the scope of the invention is not limited thereto. Applications in a diverse range of fields such as packaging, medical imaging and are anticipated as falling within the scope of the invention and some of those applications have been set out herein.

Throughout the specification and claims, the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features, that it directly references, but also other components, steps or features not specifically listed, unless the contrary is expressly stated or the context requires otherwise.

In the present specification, terms such as "part", "component", "means", "section" or "segment" may refer to singular or plural items and are terms intended to refer to a set of properties, functions or characteristics performed by one or more items having one or more parts. It is envisaged that where a "part", "component", "means", "section" or "segment" or similar term is described as consisting of a single item, then a functionally equivalent object consisting of multiple items is considered to fall within the scope of the term; and similarly, where a "part", "component", "means", "section", "segment" or similar term is described as consisting of multiple items, a functionally equivalent object consisting of a single item is considered to fall within the scope of the term. The intended interpretation of such terms described in this paragraph should apply unless the contrary is expressly stated or the context requires otherwise.

The term "connected" or a similar term, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected", or a similar term, may mean that two or more elements or components are either in direct physical or electrical contact, or that two or more elements or components are not in direct contact with each other yet still co-operate or interact with each other.

The mere disclosure of a method or system element or component in the specification should not be construed as being essential to the invention claimed herein, except where it is either expressly stated to be so or expressly recited in a claim.

The terms in the claims have the broadest scope of meaning they would have been given by a person of ordinary skill in the art as of the relevant date.

The terms "a" and "an" mean "one or more", unless expressly specified otherwise.

Neither the title nor any abstract of the present application should be taken as limiting in any way the scope of the claimed invention.

Where the preamble of a claim recites a purpose, benefit or possible use of the claimed invention, it does not limit the claimed invention to having only that purpose, benefit or possible use.

The invention claimed is:

1. A system for applying feedback to resolve user interface (UI) workflow including UI workflow features, the system being configured to enable collaborative UI development, and including:
   a server accessible by user devices via an electronic communications network, the server comprising:
      a processor;
      a database having a dataset; and
      one or more user interface,
   the processor operatively interacting with the one or more user interface to execute steps in conjunction with the database,
   the server configured to execute the steps of:
   Receiving user input from one or more user computers, each user computer being associated with one or more users performing, either as one or as a group, the following roles:
      a project initiator and/or project owner;
      an administrator; and
      a project manager;
   Resolving a UI workflow feature of the input using a trainable algorithm implemented by the server, the trainable algorithm being trainable to resolve a UI workflow feature by application of the trainable algorithm to the dataset including a plurality of labelled dataset entries, the label of each labelled dataset entry describing a UI workflow feature;
   wherein the trainable algorithm resolves the UI workflow feature of the user input by identifying in the user input a dataset entry labelled with said UI workflow feature;
   Forming a UI workflow that incorporates the resolved UI workflow feature;
   Presenting the formed UI workflow that incorporates the resolved UI workflow feature on the user devices;
   Obtaining feedback in relation to the UI workflow feature of the UI workflow presented on the user devices;
   Applying the feedback to train the trainable algorithm to resolve UI workflow features;
   wherein feedback for training the trainable algorithm is obtained from:
      project initiator and/or project owner selection, customisation or observation of features presented to the project initiator and/or project owner; and
      administrator and/or project manager validation, customisation or observation of features presented to the administrator and/or project manager;
   and wherein a chat bot or an external application is used to prompt the users, including the project intiator and/or project owner, and the administrator and/or project manager, to supply further input or update users on UI project development activities; and
   the trainable algorithm is trainable on UI workflows or actions of the project initiator and/or project owner, and the administrator and/or project manager, to enable the chat bot or external application to suggest a project activity or communicate with the users.

2. The system in accordance with claim 1, wherein the one or more users include one or more of, or a combination of, the following collaborators:
   a. A UI creation collaborator comprising a frontend developer and/or backend developer;
   b. A business analyst; or
   c. A third party;
and feedback is obtained from the one more users.

3. The system in accordance with claim 1, wherein the UI workflow feature includes:
   An element, the element consisting of any one or more of, or any combination of, a logo, text, a shape, an icon, an emoji, a line, a widget, a controller, a menu, a map, background or other visual device; and
   An attribute consisting of any one or more of, or any combination of, a screen type, project type, screen layout, text location, style, colour, gradient of a background, gradient of an element, a design pattern, shading, 3D or 2D effect, content, augmented reality (AR) or virtual reality (VR) effect, or other visual effect.

4. The system in accordance with claim 1, wherein the UI workflow feature includes any one or more, or any combination of, the following:
   the style or tone of one or more of, or a combination of, a mission/vision statement or other business related information which contextualises the UI, entity size and/or market capitalisation, a review or commentary, entity location or localisation, a description of a purpose or function for a proposed UI, technical documentation in relation to the scope and/or project development in connection with a proposed UI;
   links between multiple screens or elements, and/or the rules governing said links;
   an engagement, quality assurance or practicality parameter rating; and/or
   a programming language.

5. The system in accordance with claim 1, wherein user input includes:
   image input data, the image input data including a screenshot or a hand drawing of a UI, a UI wireframe or a UI mock-up, non-UI images, other input in a visual format; and
   text input data, the text input data including a software requirements specification (SRS), software design description (SDD), rapid application development (RAD), or other requirement document, text recovered from a social media search, text recovered from an internet search, company details including vision or mission statements, or other input in textual form.

6. The system in accordance with claim 1, wherein user input includes third party input including data sourced from the internet including by software scrapers and/or online searching; data sourced from a searchable database developed by a third party; and/or data sourced from a searchable encyclopedia or other knowledge database.

7. The system in accordance with claim 1, wherein the trainable algorithm includes an artificial neural network model for natural language processing (NLP), and/or computer vision, including imaging or pattern recognition.

8. A system in accordance with claim 7, wherein the trainable algorithm includes a computer vision enhanced segmentation algorithm for processing images recognised in the input.

9. A system in accordance with claim 8, wherein the computer vision enhanced segmentation algorithm is able to segment regions and/or elements in an image input including one or more of, or a combination of:
   icons/widgets;
   charts;
   chat bots;
   pictures;
   buttons;
   data tables;
   blocks of text;
   text labels;
   fields;
   controlled elements.

10. The system in accordance with claim 1, wherein a dataset entry label describes aspects of a UI workflow feature, the dataset entry label including any one or more of, or a combination of:
   Whether the UI workflow feature is an element or an attribute;
   A UI workflow feature class; and/or
   A UI workflow feature which is related to the UI workflow feature the subject of the label.

11. The system in accordance with claim 1, wherein a dataset entry label describes aspects of a UI workflow feature, the label including any one or more of, or a combination of:
   A UI feature which is related to the UI workflow feature the subject of the label;
   A link or rule which is related to the UI workflow feature the subject of the label;
   Accuracy data, including an input correlation algorithm score;
   A trainable algorithm score; and/or
   A rating in relation to one or more of an engagement, quality assurance or practicality parameter configured to assess user engagement, UI quality assurance, or UI practicality, respectively.

12. The system in accordance with claim 1, wherein a dataset entry label describes aspects of the UI workflow feature, the label including a phrase or tag used to label the quality of the UI workflow feature comprising any one or more of, or a combination of, the following:
   the shape, dimension or size of an element;
   the category of an element or attribute;
   text font, size or other formatting;
   the sentiment analysis of text;
   the industry type of an element or attribute;
   the screen type;
   programming language;
   screen orientation;
   the location of the element or text relative to the screen border or other elements on one or more screens;
   the colour, style, layout, shading, animation, pattern or other visual effect;
   any other quality which describes the UI workflow feature.

13. The system in accordance with claim 1, wherein the formed UI workflow includes a plurality of UI screens for presentation to the user, such that selection and/or validation feedback is obtainable from the plurality of UI screens, or regions of one or more of the plurality of UI screens, or UI workflow features of one or more of the plurality of UI screens.

14. The system in accordance with claim 1, wherein the UI workflow feature is resolvable by the trainable algorithm trained to identify a suitable link, linked features or linked screens during the process of resolving UI workflow features of the input, the suitable link linked features and/or linked screens permitting the presented UI workflow to function substantially the same as in a fully developed UI form.

15. The system in accordance with claim 14, wherein a wireframe view of the formed UI workflow including the linked screens is presentable to the user, the wireframe view indicating the links between the UI screens and/or linked features therein.

16. The system in accordance with claim 1, wherein the feedback is obtained from selections, validations and/or customisations from one or more alternative presented UI workflows, comprising:
   one or more alternative UI workflow feature;
   one or more alternative related UI workflow features;
   one or more alternative linked screens, linked UI workflow features or rules;
   one or more alternative UI screens;
   one or more linked screens, linked UI workflow features or rules;
   presented to the user for selection, the alternatives presented for selection being resolvable by the trainable algorithm.

17. The system in accordance with claim 16, wherein the alternatives presented to the user are determined based on the user input, the prior user selections and the validations.

18. The system in accordance with claim 1, wherein the plurality of labelled dataset entries includes an entry with a label that has been created by the user selecting, validating or customising a UI workflow feature resolved by the trainable algorithm.

19. The system in accordance with claim 1, wherein the trainable algorithm responds to text input provided by the user to suggest one or more project tasks to the user to assist generation of the UI.

20. The system in accordance with claim 1, wherein the chat bot or the external application prompts the user to supply further input and/or update users on activities related to their roles including as the project initiator and/or owner, the administrator and the project manager.

21. The system in accordance with claim 20, wherein the chat bot or external application is trainable by applying NLP to scraped and/or crawled data, and/or dataset entries created by the trainable algorithm.

22. The system in accordance with claim 1, wherein the system includes a further step of providing the user a clickable prototype of the presented UI workflow and/or generating the UI in a development ready form.

23. The system in accordance with claim 1, wherein there is provided the further step of generating the UI in a stable code format permitting customisation while preserving the integrity of the coding, where each dataset entry corresponding to a resolvable UI workflow feature has a corresponding stable code portion.

24. A non-transitory computer readable storage medium comprising instructions that, responsive to execution by a computer, cause the computer to implement a method or system of applying feedback to resolve user interface (UI) workflows including UI workflow features, the system or method being configured to enable collaborative UI development, and including carrying out the steps of:

Receiving user input from one or more users performing each of, but not limited to, the following roles:

a project initiator and/or project owner;

an administrator; and a project manager;

Resolving a UI workflow feature of the input using a trainable algorithm implemented by the server, the trainable algorithm being trainable to resolve a UI workflow feature by application of the trainable algorithm to the dataset including a plurality of labelled dataset entries, the label of each labelled dataset entry describing a UI workflow feature;

wherein the trainable algorithm resolves the UI workflow feature of the user input by identifying in the user input a dataset entry labelled with said UI workflow feature;

Forming a UI workflow that incorporates the resolved feature;

Presenting the formed UI workflow;

Obtaining feedback in relation to the UI workflow feature of the UI workflow presented on the user devices;

Applying the feedback to train the trainable algorithm to resolve UI workflow features;

wherein feedback for training the trainable algorithm is obtained from:

project initiator and/or project owner selection, customisation or observation of features presented to the project initiator and/or project owner; and administrator and/or project manager validation, customisation or observation of features presented to the administrator and/or project manager;

and a chat bot or an external application is used to prompt the users, including the project initiator and/or project owner, and the administrator and/or project manager, to supply further input or update users on UI project development activities; and the trainable algorithm is trainable on UI workflows or actions of the project initiator and/or project owner, and the administrator and/or project manager, to enable the chat bot or external application to suggest a project activity or communicate with the users.

* * * * *